United States Patent
Yamamoto et al.

(10) Patent No.: US 8,495,325 B2
(45) Date of Patent: Jul. 23, 2013

(54) COMPUTER SYSTEM AND DATA MIGRATION METHOD THEREOF

(75) Inventors: Masayuki Yamamoto, Sagamihara (JP);
Akio Nakajima, Yokohama (JP);
Yasunori Kaneda, Yokohama (JP);
Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 13/203,811

(22) PCT Filed: Jul. 22, 2011

(86) PCT No.: PCT/JP2011/004159
§ 371 (c)(1),
(2), (4) Date: Aug. 29, 2011

(87) PCT Pub. No.: WO2013/014702
PCT Pub. Date: Jan. 31, 2013

(65) Prior Publication Data
US 2013/0024639 A1   Jan. 24, 2013

(51) Int. Cl.
*G06F 12/02* (2006.01)
(52) U.S. Cl.
USPC .......... 711/165; 711/154; 711/161; 711/170; 711/E12.002

(58) Field of Classification Search
USPC .................. 711/165, 154, 161, 170, E12.002
See application file for complete search history.

(56) References Cited

U.S. PATENT DOCUMENTS
7,697,515 B2    4/2010  Ofer et al.
2007/0260840 A1  11/2007  Watanabe

OTHER PUBLICATIONS
PCT International Search Report and Written Opinion on application PCT/JP2011/004159 mailed Feb. 8, 2012; 10 pages.

*Primary Examiner* — Yong Choe
(74) *Attorney, Agent, or Firm* — Foley & Lardner LLP

(57) ABSTRACT

Data migration can be preformed between source and target storage subsystems without stopping exchanging data between a host computer and each of the storage subsystems. After a next access path, which should be set instead of a specific access path in an available state among access paths, is set between the host computer and a migration target logical unit via a host port and a target port, the status of the next access path is set to an available state and the status of the specific access path is set to an unavailable state. After the next access path is set to an available state, data is migrated from a migration source logical unit of the source storage subsystem to the migration target logical unit of the target storage subsystem.

10 Claims, 36 Drawing Sheets

(Phase1) Two Ports Active [Initial State]

(Phase2) A Port in Migration Source Unavailable (Phase3) A Port in Migration Source LOGOFF and Port ID replacement (Phase4) A Port in Migration Target LOGIN (Phase5) A Port in Migration Target Active and Unit Attention to Host (Phase6) Two Ports Active [Final State]

| LU Name | LU ID | Path ID | Host Port Name | Host Port N_Port ID | ALUA Status |
|---|---|---|---|---|---|
| LU1 | VST01VV1 | LU1-Path1 | HP01 | N_Port1 | Active |
| LU1 | VST01VV1 | LU1-Path2 | HP02 | N_Port2 | Unavailable |
| LU1 | VST01VV1 | LU1-Path3 | HP03 | N_Port3 | OFFLINE |
| LU2 | VST01VV2 | LU2-Path1 | HP01 | N_Port1 | Active |
| LU2 | VST01VV2 | LU2-Path2 | HP02 | N_Port2 | Active |

| System Name | System Type | IP アドレス |
|---|---|---|
| ST01 | Storage Subsystem | 10.10.10.10 |
| ST02 | Storage Subsystem | 10.10.10.11 |
| H01 | Host Computer | 10.10.10.12 |

| Migration Order | Host Name | LU Name | Host Port Name | Source Subsystem | Source Port Name | Target Subsystem | Target Port Name |
|---|---|---|---|---|---|---|---|
| 1 | H01 | LU1 | HP01 | ST01 | PortA | ST02 | PortC |
| 2 | H01 | LU1 | HP02 | ST01 | PortB | ST02 | PortD |
| 3 | H01 | LU1 | HP03 | ST01 | PortX | ST02 | PortY |

27210  27220  27223  27225  27230  27240  27250  27260

| Migration Status |
|---|
| Done |
| In Progress |
| N/A |

| LU Name | Port Name | Physical N_Port ID (PN_WWN) | Virtual N_Port ID (VN_WWN) | Physical LU ID (P_LDEV) | Virtual Storage Subsystem Name | Virtual LU ID (V_LDEV) |
|---|---|---|---|---|---|---|
| LU01 | PortA | PN_PortA | VN_PortA | PV1 | VST01 | VV1 |
| LU01 | PortB | PN_PortB | VN_PortB | PV1 | VST01 | VV1 |
| LU02 | PortX | PN_PortX | VN_PortX | PV3 | VST02 | VV3 |

| LDEV ID (P_LDEV) | Device | Cache Mode | LDEV Migration Status |
|---|---|---|---|
| PV1 | HDD Group 01 | ON | Copy Target |
| PV4 | Subsystem ST02 LU05 | OFF | Copy Source |
| PV2 | HDD Group 02 | ON | N/A |
| PV3 | HDD Group 03 | ON | N/A |

| Group ID | Storage Subsystem Name | Virtual LU ID (V_LDEV) | Physical Storage Subsystem Name | LU Name | Physical LU ID (P_LDEV) | Port Name | Physical N_Port ID (PN_WWN) | Virtual N_Port ID (VN_WWN) |
|---|---|---|---|---|---|---|---|---|
| 1 | VST01 | VV1 | ST01 | LU01 | PV1 | Port1 | PN_PortA | VN_PortA |
| 1 | VST01 | VV1 | ST01 | LU01 | PV1 | Port2 | PN_PortB | VN_PortB |
| 1 | VST01 | VV1 | ST02 | LU02 | PV2 | Port3 | PN_PortC | VN_PortC |
| 1 | VST01 | VV1 | ST02 | LU02 | PV2 | Port4 | PN_PortD | VN_PortD |

55410 55415 55420 55430 55440 55441 55450 55451 55452

55400

| Fabric | ALUA Status | Role |
|---|---|---|
| LOGIN | Unavailable | Source |
| LOGIN | Active | Active |
| LOGOFF | Offline | Target |
| LOGOFF | Offline | Active |

55460 55461 55470

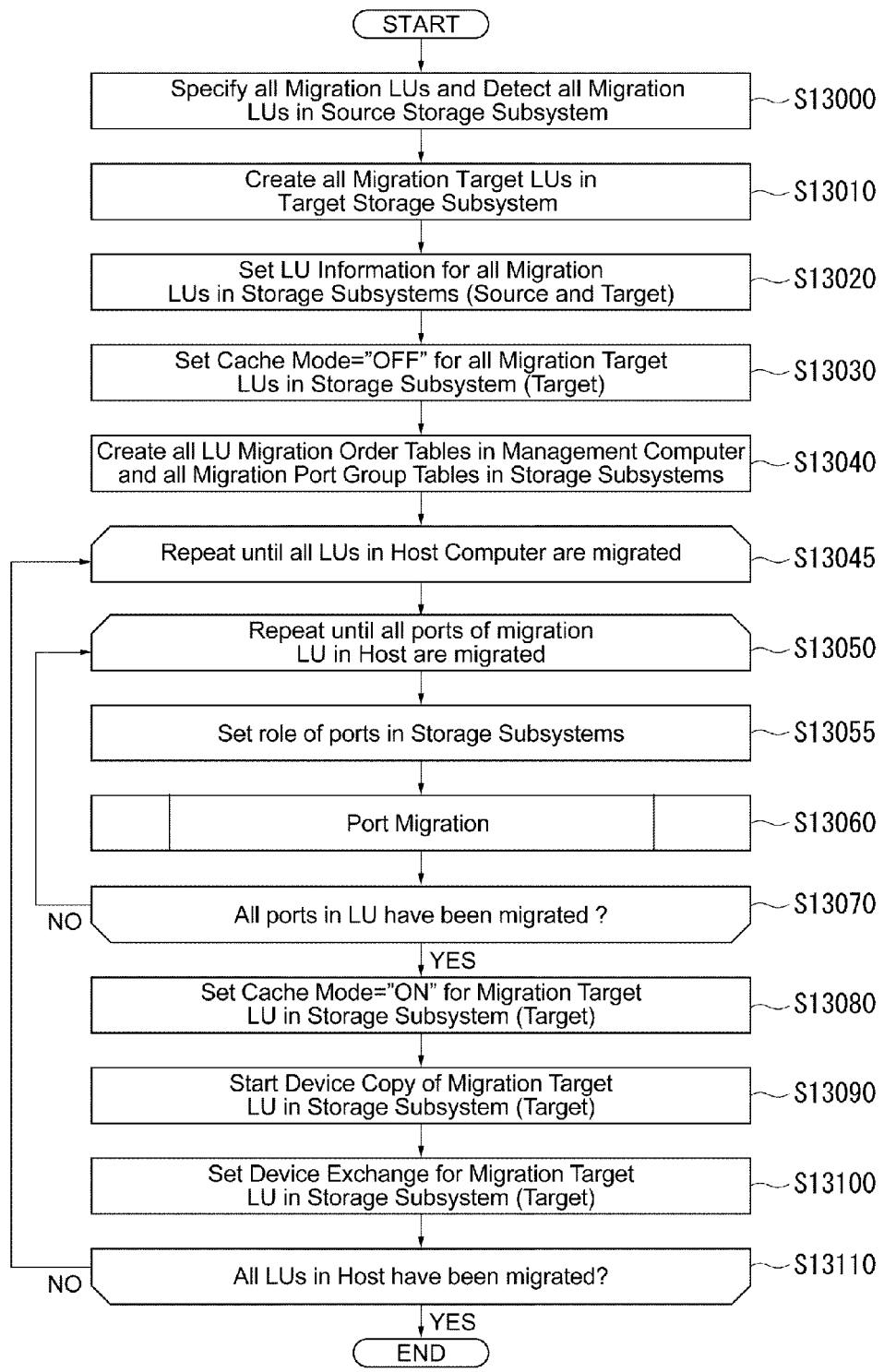

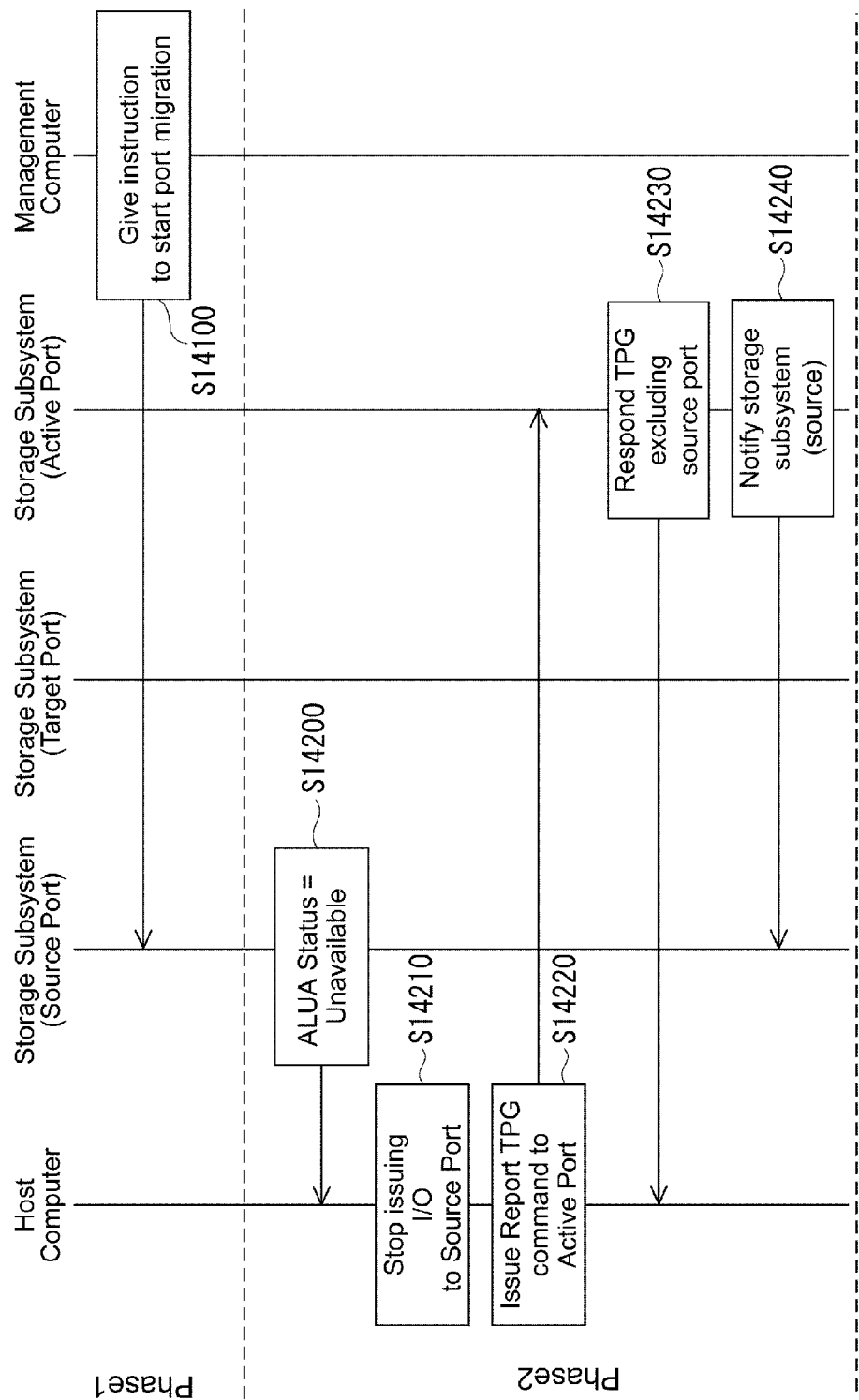

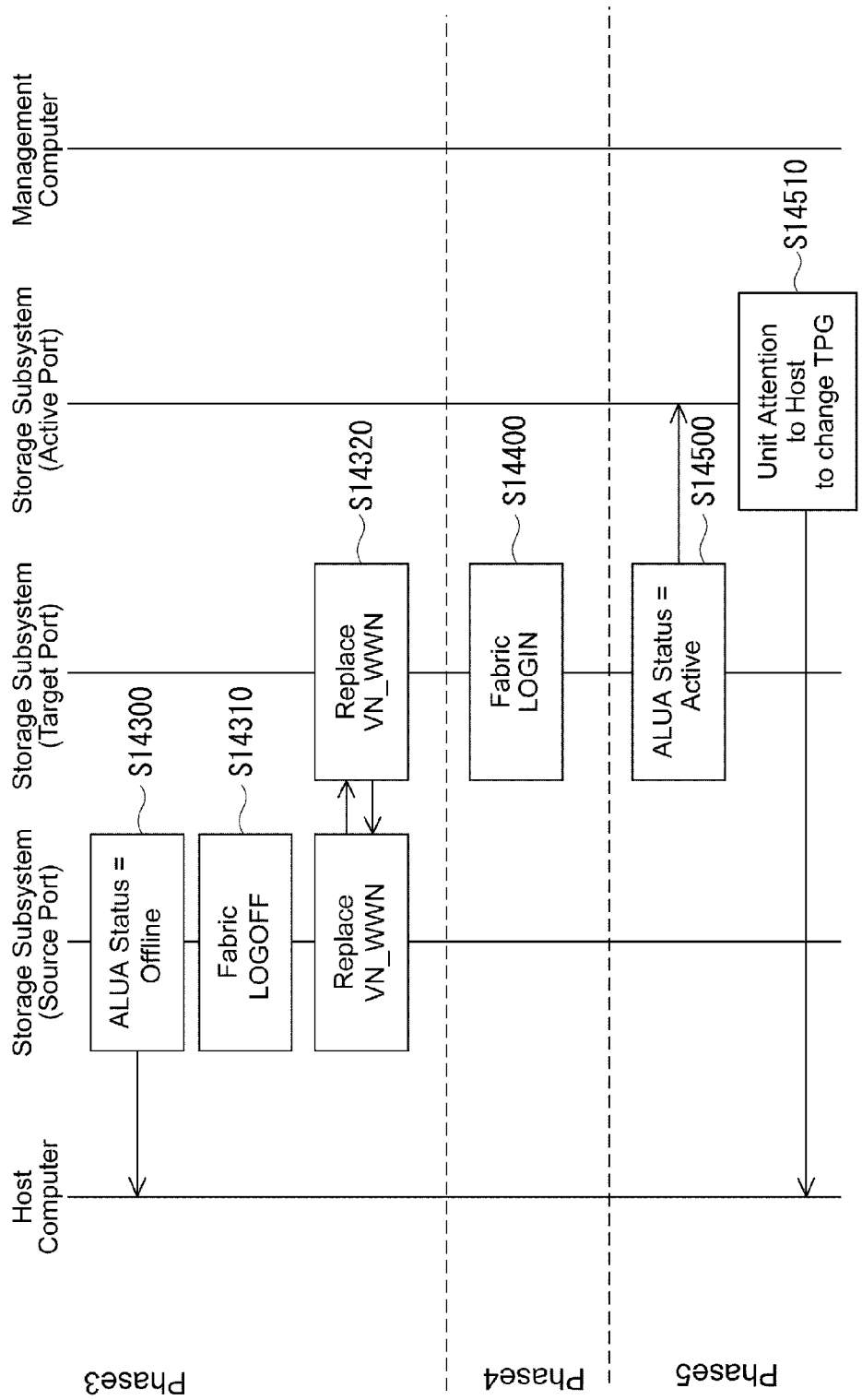

(Phase1) Two Ports Active [Initial State]

(Phase2) A Port in Migration Source Unavailable (Phase3) A Port in Migration Source LOGOFF and Peer Zoning Change (Phase4) A Port in Migration Target LOGIN and Peer Zoning Change (Phase5) A Port in Migration Target Active and Unit Attention to Host (Phase6) Two Ports Active [Final State]

Fig.18

| Zone Status | Host Physical N_Port ID (PN_WWN) | Storage Physical N_Port ID (PN_WWN) |
|---|---|---|
| Deny | Port1 | PortA |
| Active | Port1 | PortC |
| Active | Port2 | PortB |
| Deny | Port2 | PortD |

55500

55510  55520  55530

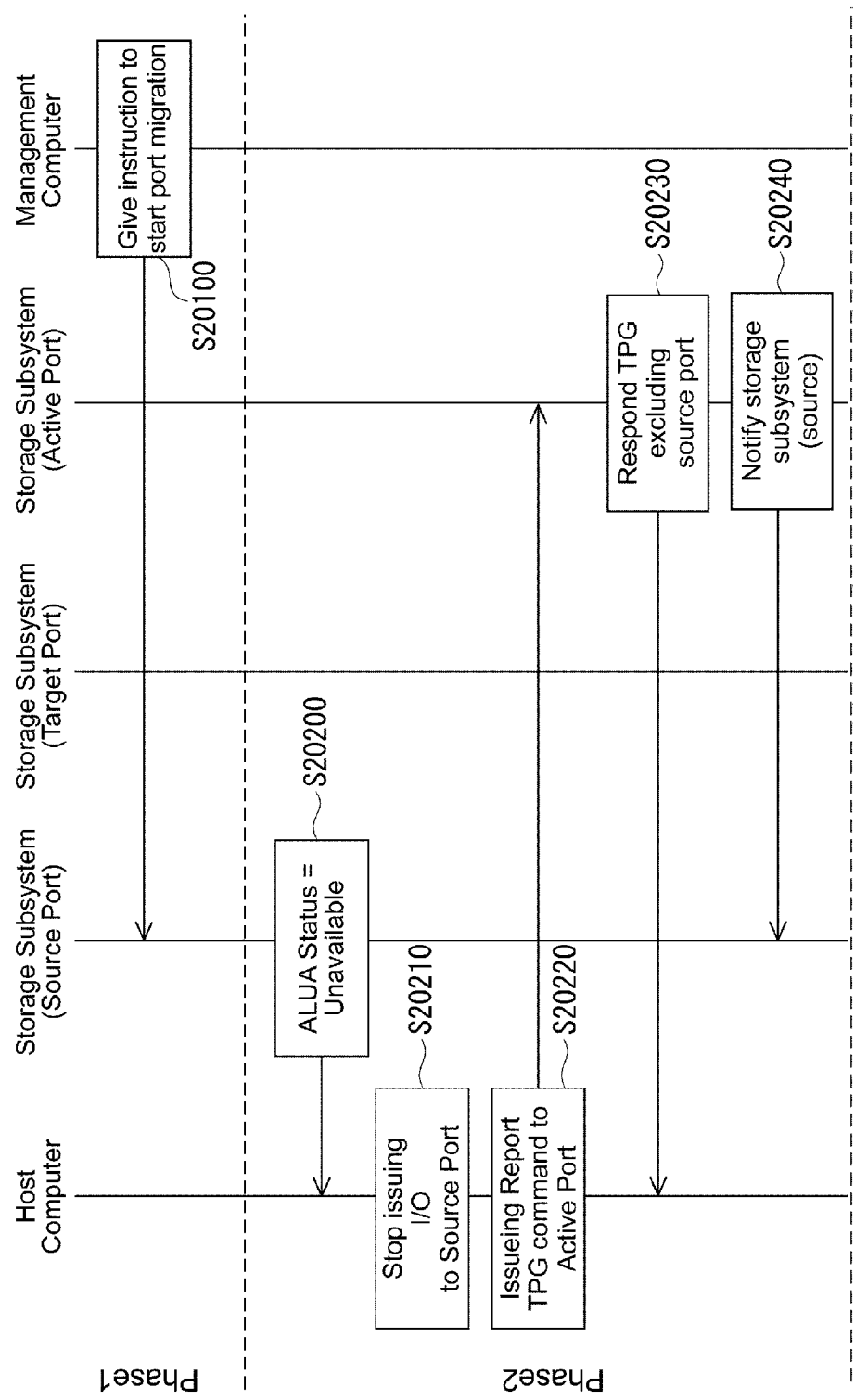

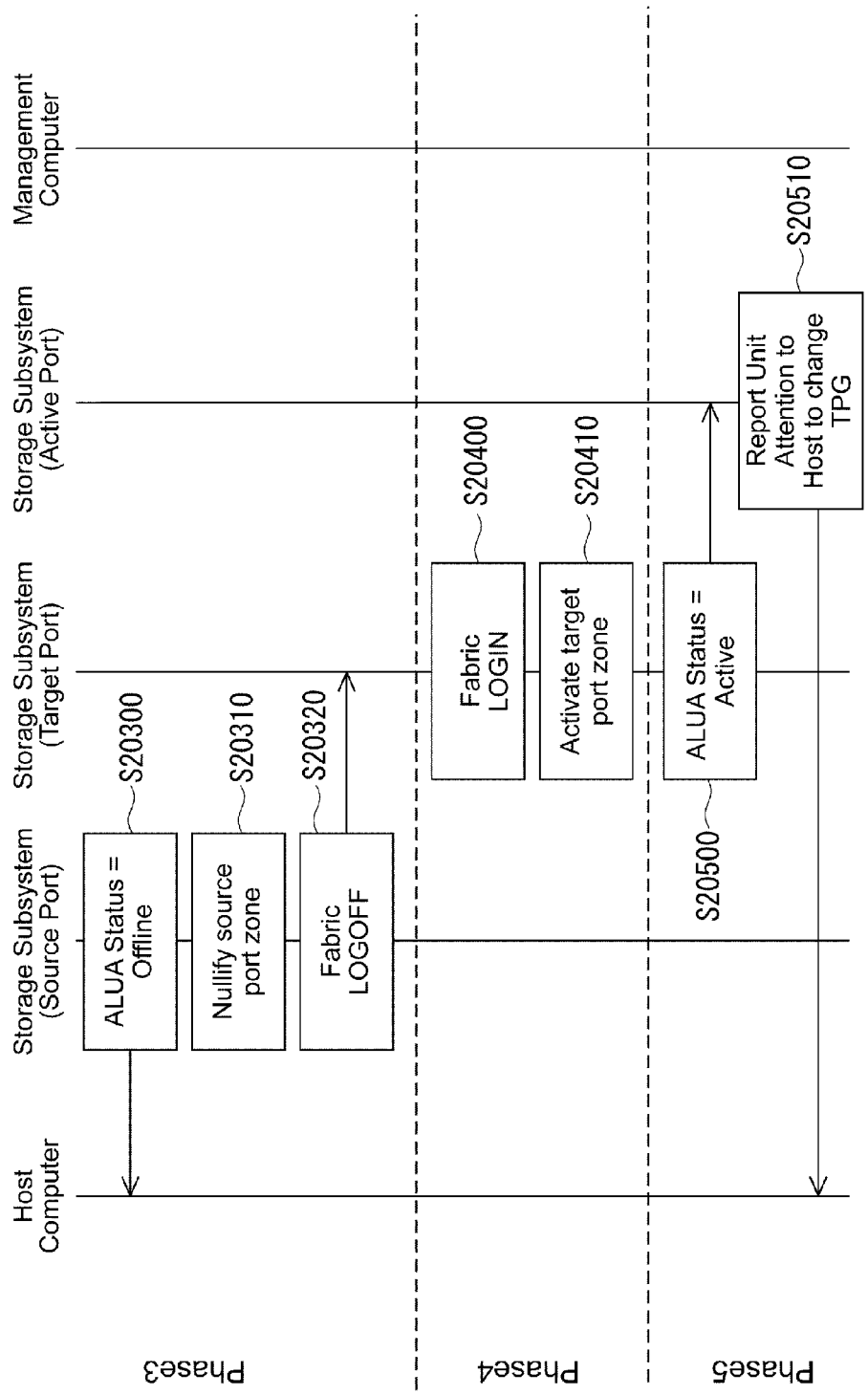

Fig.21A

Storage Subsystem ST0   Storage Subsystem ST1   Fabric Zoning (1) Source:PortA, Target:PortC, Phase1

| PortA | PortB | PortC | PortD | | | |
|---|---|---|---|---|---|---|
| PN_PortA | PN_PortB | PN_PortC | PN_PortD | A | N_Port1 | PN_PortA |
| Active | Active | N/A | N/A | D | N_Port1 | PN_PortC |
| LOGIN | LOGIN | LOGOFF | LOGOFF | A | N_Port2 | PN_PortB |
| | | | | D | N_Port2 | PN_PortD |

(2) Source:PortA, Target:PortC, Phase2

| PortA | PortB | PortC | PortD | | | |
|---|---|---|---|---|---|---|
| PN_PortA | PN_PortB | PN_PortC | PN_PortD | A | N_Port1 | PN_PortA |
| *Unavail.* | Active | N/A | N/A | D | N_Port1 | PN_PortC |
| LOGIN | LOGIN | LOGOFF | LOGOFF | A | N_Port2 | PN_PortB |
| | | | | D | N_Port2 | PN_PortD |

(3) Source:PortA, Target:PortC, Phase3

| PortA | PortB | PortC | PortD | | | |
|---|---|---|---|---|---|---|
| PN_PortA | PN_PortB | PN_PortC | PN_PortD | *D* | N_Port1 | PN_PortA |
| *Offline* | Active | N/A | N/A | D | N_Port1 | PN_PortC |
| *LOGOFF* | LOGIN | LOGOFF | LOGOFF | A | N_Port2 | PN_PortB |
| | | | | D | N_Port2 | PN_PortD |

(4) Source:PortA, Target:PortC, Phase4

| PortA | PortB | PortC | PortD | | | |
|---|---|---|---|---|---|---|
| PN_PortA | PN_PortB | PN_PortC | PN_PortD | D | N_Port1 | PN_PortA |
| N/A | Active | *Offline* | N/A | *A* | N_Port1 | PN_PortC |
| LOGOFF | LOGIN | *LOGIN* | LOGOFF | A | N_Port2 | PN_PortB |
| | | | | D | N_Port2 | PN_PortD |

(5) Source:PortA, Target:PortC, Phase5

| PortA | PortB | PortC | PortD | | | |
|---|---|---|---|---|---|---|
| PN_PortA | PN_PortB | PN_PorC | PN_PortD | D | N_Port1 | PN_PortA |
| N/A | *Unit Atn.* | *Active* | N/A | A | N_Port1 | PN_PortC |
| LOGOFF | LOGIN | LOGIN | LOGOFF | A | N_Port2 | PN_PortB |
| | | | | D | N_Port2 | PN_PortD |

(6) Source:PortA, Target:PortC, Phase6

| PortA | PortB | PortC | PortD | | | |
|---|---|---|---|---|---|---|
| PN_PortA | PN_PortB | PN_PortC | PN_PortD | D | N_Port1 | PN_PortA |
| N/A | *Active* | Active | N/A | A | N_Port1 | PN_PortC |
| LOGOFF | LOGIN | LOGIN | LOGOFF | A | N_Port2 | PN_PortB |
| | | | | D | N_Port2 | PN_PortD |

Fig.21B

Storage Subsystem ST0    Storage Subsystem ST1    Fabric Zoning (7) Source:PortB, Target:PortD, Phase1

| PortA | PortB | PortC | PortD |
|---|---|---|---|
| PN_PortA | PN_PortB | PN_PortC | PN_PortD |
| N/A | _Active_ | Active | N/A |
| LOGOFF | LOGIN | LOGIN | LOGOFF |

| D | N_Port1 | PN_PortA |
|---|---|---|
| A | N_Port1 | PN_PortC |
| A | N_Port2 | PN_PortB |
| D | N_Port2 | PN_PortD |

(8) Source:PortB, Target:PortD, Phase2

| PortA | PortB | PortC | PortD |
|---|---|---|---|
| PN_PortA | PN_PortB | PN_PortC | PN_PortD |
| N/A | _Unavail._ | Active | N/A |
| LOGOFF | LOGIN | LOGIN | LOGOFF |

| D | N_Port1 | PN_PortA |
|---|---|---|
| A | N_Port1 | PN_PortC |
| A | N_Port2 | PN_PortB |
| D | N_Port2 | PN_PortD |

(9) Source:PortB, Target:PortD, Phase3

| PortA | PortB | PortC | PortD |
|---|---|---|---|
| PN_PortA | PN_PortB | PN_PortC | PN_PortD |
| N/A | _Offline_ | Active | N/A |
| LOGOFF | _LOGOFF_ | LOGIN | LOGOFF |

| D | N_Port1 | PN_PortA |
|---|---|---|
| _D_ | N_Port1 | PN_PortC |
| A | N_Port2 | PN_PortB |
| D | N_Port2 | PN_PortD |

(10) Source:PortB, Target:PortD, Phase4

| PortA | PortB | PortC | PortD |
|---|---|---|---|
| PN_PortA | PN_PortB | PN_PortC | PN_PortD |
| N/A | N/A | Active | _Offline_ |
| LOGOFF | LOGOFF | LOGIN | _LOGIN_ |

| D | N_Port1 | PN_PortA |
|---|---|---|
| D | N_Port1 | PN_PortC |
| A | N_Port2 | PN_PortB |
| _A_ | N_Port2 | PN_PortD |

(11) Source:PortB, Target:PortD, Phase5

| PortA | PortB | PortC | PortD |
|---|---|---|---|
| PN_PortA | PN_PortB | PN_PortC | PN_PortD |
| N/A | N/A | _Unit.Attn._ | _Active_ |
| LOGOFF | LOGOFF | LOGIN | _LOGIN_ |

| D | N_Port1 | PN_PortA |
|---|---|---|
| D | N_Port1 | PN_PortC |
| A | N_Port2 | PN_PortB |
| A | N_Port2 | PN_PortD |

(12) Source:PortB, Target:PortD, Phase6

| PortA | PortB | PortC | PortD |
|---|---|---|---|
| PN_PortA | PN_PortB | PN_PortC | PN_PortD |
| N/A | N/A | _Active_ | Active |
| LOGOFF | LOGOFF | LOGIN | LOGIN |

| D | N_Port1 | PN_PortA |
|---|---|---|
| D | N_Port1 | PN_PortC |
| A | N_Port2 | PN_PortB |
| A | N_Port2 | PN_PortD |

(Phase1) Two Ports Active [Initial State]

(Phase2) A Port in Migration Target LOGIN and Peer Zoning Change (Phase3) A Port in Migration Target Active, and Unit Attention to Host (Phase4) A Port in Migration Source Unavailable (Phase 5) A Port in Migration Source LOGOFF,
Peer Zoning Change, and Unit Attention to Host (Phase6) Two Ports Active [Final State]

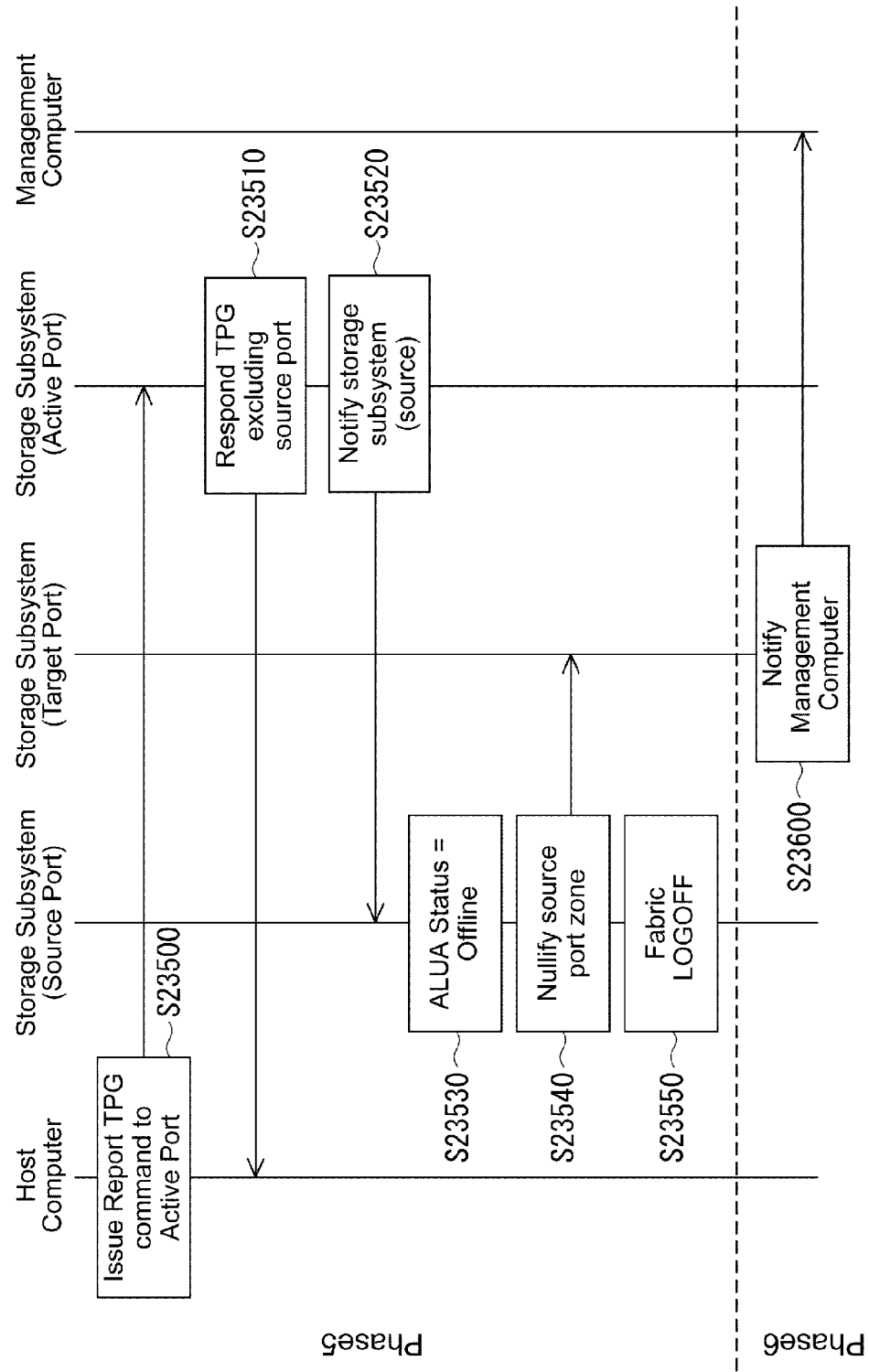

COMPUTER SYSTEM AND DATA MIGRATION METHOD THEREOF

TECHNICAL FIELD

The present invention relates to a computer system and a data migration method thereof. Particularly, the invention is suited for use in data migration when replacing a storage subsystem.

BACKGROUND ART

In a computer system handling large-scale data, data is stored in a large-capacity storage device other than a host system. When an existing storage subsystem is replaced with a new storage subsystem in the computer system thereof, it is necessary to migrate data stored in the existing storage subsystem to the new storage subsystem in order to continuously use the data stored in the existing storage subsystem.

As one of subjects for migrating data when replacing the storage subsystems thereof, there is a problem regarding an increase in the burden of changing the settings of a host computer. Since each storage subsystem has its unique identifier, replacement of the storage subsystem causes a change of a data transmission and/or reception (I/O access) path from the host computer to a storage area (Logical Unit, hereinafter abbreviated as LU) of the storage subsystem. Therefore, a system administrator needs to change the settings of the host computer when replacing the storage subsystem. Patent Literature 1 discloses a method for reducing the burden of changing the settings of a host computer during data migration between a source storage subsystem and a target storage subsystem.

In Patent Literature 1 the source and target storage subsystems assigns, in addition to a port identifier specific to each system, a virtual port ID used to identify an access path from the host computer (hereinafter referred to the virtual port ID) to a port which serves as an access path from the host computer to the storage area above. With this method, the storage area of the target storage subsystem inherits and uses the virtual port ID of a logical unit of the source storage subsystem by procedures described below. As a result, the host computer can change an access target storage subsystem to the target storage subsystem by continuing I/O access to the above-mentioned storage area via the virtual port ID which is conventionally set. Such procedures are exemplified as follows.

Step 1: Data is copied from a storage area of the source storage subsystem to a storage area of the target storage subsystem.

Step 2: When a mirror state is established in Step 1, the host computer stops issuing I/O.

Step 3: A port of the target storage subsystem takes over a virtual port ID of a port of the source storage subsystem.

Step 4: The storage area of the target storage subsystem takes over an identifier of the storage area of the source storage subsystem.

Step 5: The host computer resumes issuing I/O.

With a conventional storage system, a host computer issues a write command to one storage device and stores data in a volume of the one storage device (hereinafter referred to as the primary storage device); and in synchronization with this storage processing, the host computer stores copy data of the above-mentioned data in a volume of the other storage device (hereinafter referred to as the secondary storage device). If a failure occurs in the primary storage device of the conventional storage system having such a redundant configuration, the processing is continued by using the copy data in the secondary storage device (see Patent Literature 1). If such Patent Literature 1 is used when the system administrator replaces the storage subsystem, the burden is reduced for the host computer to change the settings for accessing the storage area.

CITATION LIST

Patent Literature

PTL 1: U.S. Pat. No. 7,697,515

SUMMARY OF INVENTION

Technical Problem

However, by the method of Patent Literature 1, when performing Step 2 through Step 5 described above, the host computer stops issuing I/O to the storage area to be migrated. Although business continuity is an important requirement for a computer system in recent years, the configuration disclosed in Patent Literature 1 is designed so that the host computer stops issuing I/O to the storage area of the storage subsystem. Consequently, the problem is that the computer system cannot continue operation.

The present invention was devised in consideration of the circumstances and aims at suggesting a computer system and a data migration method thereof capable of migrating data between the source and target storage subsystems without stopping I/O access from the host computer to a logical unit in the storage subsystem.

Solution to Problem

In order to solve such problems, a computer system according to the present invention includes: a source storage subsystem including a source port and a migration source logical unit capable of storing data; a target storage subsystem including a target port and a migration target logical unit capable of storing the data migrated from the migration source logical unit via a data line for coupling to the source storage subsystem; a host computer including a host port and being capable of forming an access path for transmitting and receiving data to and from the migration source logical unit or the migration target logical unit via the host port and the source port or the target port; a management computer managing the source and target storage subsystems and the host computer; and a fabric connection device including a fibre channel switch for mutually coupling the host port of the host computer, the source port of the source storage subsystem, and the target port of the target storage subsystem; wherein the management computer includes a path migration control unit setting a next access path, which should be used instead of a specific access path in an available state of the access path, between the host computer and the migration target logical unit via the host port and the target port, and then setting the next access path to an available state and setting the status of the specific access path to an unavailable state; and wherein the source or target storage subsystem comprises: an access path status management unit managing the status of the access paths; and a data migration unit migrating data from the migration source logical unit of the source storage subsystem to the migration target logical unit of the target storage subsystem after the next access path is set to an available state.

Furthermore, a data migration method for a computer system according to the present invention includes: a source storage subsystem including a source port and a migration source logical unit capable of storing data; a target storage subsystem including a target port and a migration target logical unit capable of storing the data migrated from the migration source logical unit via a data line for coupling to the source storage subsystem; a host computer including a host port and being capable of forming an access path for transmitting and receiving data to and from the migration source logical unit or the migration target logical unit via the host port and the source port or the target port; a management computer managing the source and target storage subsystems and the host computer; and a fabric connection device mutually fabric-coupling the host port of the host computer, the source port of the source storage subsystem, and the target port of the target storage subsystem; the data migration method comprising: a path migration control step whereby the management computer sets a next access path, which should be used instead of a specific access path in an available state of the access path, between the host computer and the migration target logical unit via the host port and the target port, and then sets the next access path to an available state and sets the status of the specific access path to an unavailable state; and a data migration step whereby the source or target storage subsystem migrates data from the migration source logical unit of the source storage subsystem to the migration target logical unit of the target storage subsystem after the next access path is set to an available state.

When migrating data between the source and target storage subsystems, even if the host computer is in a condition where it cannot transmit or receive data via the specific access path, according to each of the above-described inventions it is possible to continuously transmit data to or receive data from the migration source logical unit of the source storage subsystem via the next access path in an available state, which exists except the specific access path.

Advantageous Effects of Invention

According to the present invention, data can be migrated between the source and target storage subsystems without stopping data transmission and reception between the host computer and each of the storage subsystems.

BRIEF DESCRIPTION OF DRAWINGS

FIG. 6 is a diagram showing the configuration of a system detection table belonging to the management computer in the first embodiment.

FIG. 7 is a diagram showing the configuration of an LU migration order table belonging to the management computer in the first embodiment.

FIG. 9 is a diagram showing the configuration of an LU table belonging to the storage subsystem in the first embodiment.

FIG. 10 is a diagram showing the configuration of an LDEV table belonging to the storage subsystem in the first embodiment.

FIG. 12 is a diagram showing the configuration of a migration port group table belonging to the storage subsystem in the first embodiment.

FIG. 13 is a flowchart of an LU migration control program belonging to the management computer in the first embodiment.

FIG. 14A is a ladder chart of processing executed by the host computer, the management computer, the source storage subsystem, and the target storage subsystem, respectively, during LU migration in the first embodiment.

FIG. 14B is a ladder chart of processing executed by the host computer, the management computer, the source storage subsystem, and the target storage subsystem, respectively, during LU migration in the first embodiment.

FIG. 18 is a diagram showing the configuration of a Fabric zone table belonging to the storage subsystem according to the second embodiment.

FIG. 20A is a ladder chart of processing executed by the host computer, the management computer, the source storage subsystem, and the target storage subsystem, respectively, during LU migration according to the second embodiment.

FIG. 20B is a ladder chart of processing executed by the host computer, the management computer, the source storage subsystem, and the target storage subsystem, respectively, during LU migration according to the second embodiment.

FIG. 21A is a diagram specifically showing a port status transition when the LU migration control program is applied to migration of two active ports according to the second embodiment.

FIG. 21B is a diagram specifically showing a port status transition when the LU migration control program is applied to migration of two active ports according to the second embodiment.

FIG. 23C is a ladder chart of processing executed by the host computer, the management computer, the source storage subsystem, and the target storage subsystem, respectively, during LU migration according to the third embodiment.

DESCRIPTION OF EMBODIMENTS

Figure 1A:
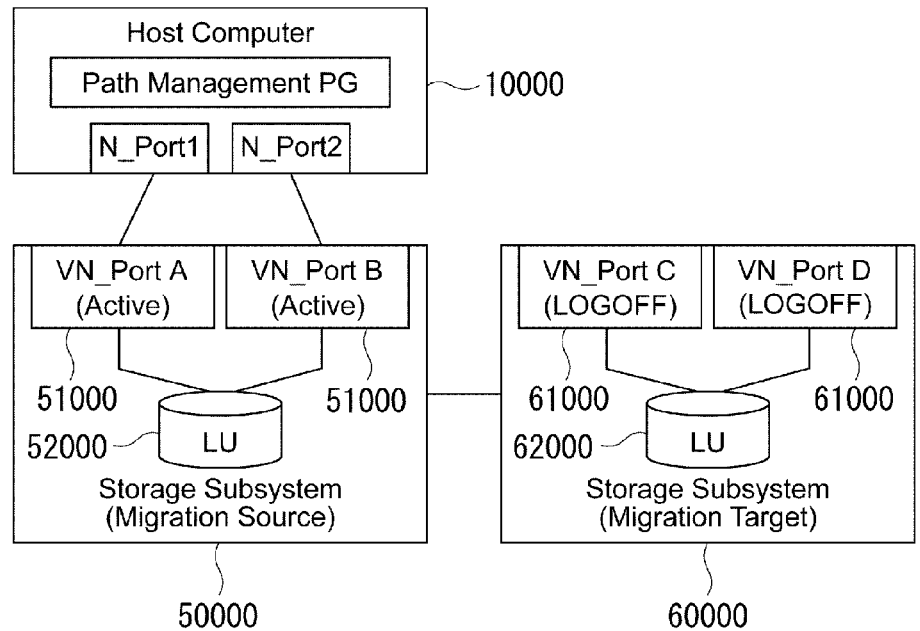
FIG. 1A is a diagram showing the outline of a first data migration method for a storage subsystem in a first embodiment.

An embodiment of the present invention will be explained in detail with reference to the attached drawings.

(1) Data Migration System for Computer System in First Embodiment (1-1) System Outline FIG. 1 shows the outline of a data migration system by means of a takeover of a virtual port ID in a first embodiment. According to the first embodiment, data migration between a plurality of storage subsystems is controlled without stopping I/O access from a host computer to each of the storage subsystems by means of the following takeover of the virtual port ID.

In the following explanation, a storage subsystem on a migration source side of these storage subsystems will be referred to as a source storage subsystem, and a storage subsystem on a migration target side will be referred to as a target storage subsystem. Furthermore, each of these storage subsystems has a physical port and each physical port can be assigned a virtual port. In the following explanation, this physical port may be simply referred to as a port and the virtual port assigned to this physical port may be referred to as a virtual port. Furthermore, an identifier assigned to the physical port may be referred to as a port ID, while an identifier assigned to the virtual port may be referred to as a virtual port ID.

(1-1-1) Fibre Channel Specification

According to a general Fibre Channel specification, a plurality of ports assigned the same virtual port ID cannot be logged into so called Fabric at the same time. In this case, it is possible to have the target storage subsystem take over the virtual port ID of the source storage subsystem; however, in that case, in order to take over the virtual port ID, the source storage subsystem firstly needs to set a port corresponding to the virtual port ID logged off once; and after the target storage subsystem set its own port taken over the relevant virtual port ID, the target storage subsystem needs to set that port logged into the Fabric. However, as a matter of course, a host computer cannot continue I/O access with the storage subsystem while the takeover above is in progress.

(1-1-2) Premise

The first embodiment is configured on a premise that a plurality of access paths exist between a host computer 10000 and each logical unit on storage subsystems 50000, 60000, using a Multipath I/O function provided by an operating system (OS of the host computer 10000) as shown in FIG. 1A to 1F, etc. In other words, in this embodiment, while a virtual port ID is being taken over through one access path, the state which is capable of issuing I/O through another access path is maintained.

Each of the source and target storage subsystems 50000 and 60000 manages an ALUA (Asymmetric LU Access) status of a port in accordance with ALUA which is a SCSI specification regarding the Multipath I/O function. On the other hand, the host computer 10000 controls an I/O issuance target access path group so that I/O access will not be issued to the access path through which the virtual port ID is taken over.

With this data migration method, a six state transition from Phase 1 (migration start state (shown as Initial State in FIG. 1A)) to Phase 6 (migration completed state (shown as Final State in FIG. 1F)) is performed. Firstly, how the relevant drawing in each phase is illustrated will be explained.

The host computer 10000 has two ports. These ports are respectively assigned N_Port1, N_Port2 as their port identifiers.

Meanwhile, each of the source storage subsystem 50000 and the target storage subsystem 60000 has two ports. These ports are assigned virtual ports; and the two virtual ports of the source storage subsystem 50000 are assigned VN_Port A and VN_Port B as their virtual port IDs, while the two virtual ports of the target storage subsystem 60000 are assigned VN_Port C and VN_Port D.

A solid line between the host computer 10000 and the source storage subsystem 50000 indicates that an access path from the host computer 10000 to a logical unit 52000 exists and can issue I/O. A solid line between the host computer 10000 and the target storage subsystem 60000 indicates that an access path from the host computer 10000 to a logical unit 62000 exists and can issue I/O. On the other hand, a broken line between them indicates that an access path from the host computer 10000 to the relevant logical unit exists, however it is in a state incapable of issuing I/O. If neither solid line nor broken line exists between them, it means that no access path from the host computer 10000 to the logical unit exists.

Regarding a port 51000 of the source storage subsystem 50000 and a port 61000 of the target storage subsystem 60000, its virtual port ID is mentioned on an upper line in the relevant frame in the drawing and its ALUA status or Fabric connection status is mentioned on a lower line in that frame. With the computer system according to this embodiment by applying this data migration system, the virtual port ID VN_Port A is taken over by the target storage subsystem 60000 from the source storage subsystem 50000 while keeping at least one access path, in an Active state, from at least one host computer 10000 to the logical unit, so that I/O access can be made from the host computer 10000 to the LU (hereinafter referred to as the logical unit) of the target storage subsystem 60000 having a port corresponding to the virtual port ID VN_Port A after the takeover.

(1-1-3) State Transition in Each Phase

In this embodiment, the state transition is managed by dividing a data migration method by the data migration system into six phases. The state transition between the respective phases will be explained below.

In Phase 1 shown in FIG. 1A, an access path through which the host computer 10000 accesses a logical unit via ports corresponding to the virtual port ID VN_Port A and the virtual port ID VN_Port B of the source storage subsystem 50000. The ALUA status of these access paths is Active and the host computer 10000 is in a state capable of issuing I/O to both the access paths. In the following explanation, the virtual port ID VN_Port A is migrated to the target storage subsystem 60000 while the ALUA status with respect to the logical unit via the port corresponding to the virtual port ID VN_Port B is kept Active.

Figure 1B:
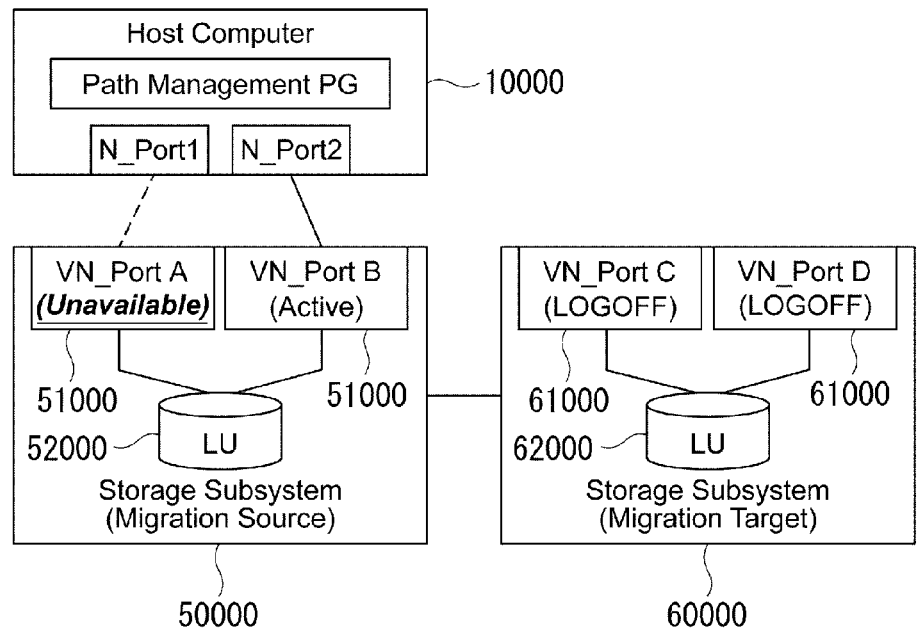
FIG. 1B is a diagram showing the outline of the first data migration method for the storage subsystem in the first embodiment.

In Phase 2 shown in FIG. 1B, the source storage subsystem has the ALUA status of the port with the virtual port ID VN_Port A make the transition to a state incapable of I/O access (Unavailable). Because of this state transition, the access path from the host computer to the LU with the virtual port ID VN_Port A exists, however the host computer can no longer issue I/O. As a result, the host computer makes I/O access to the logical unit via the port with the virtual port ID VN_Port B.

Figure 1C:
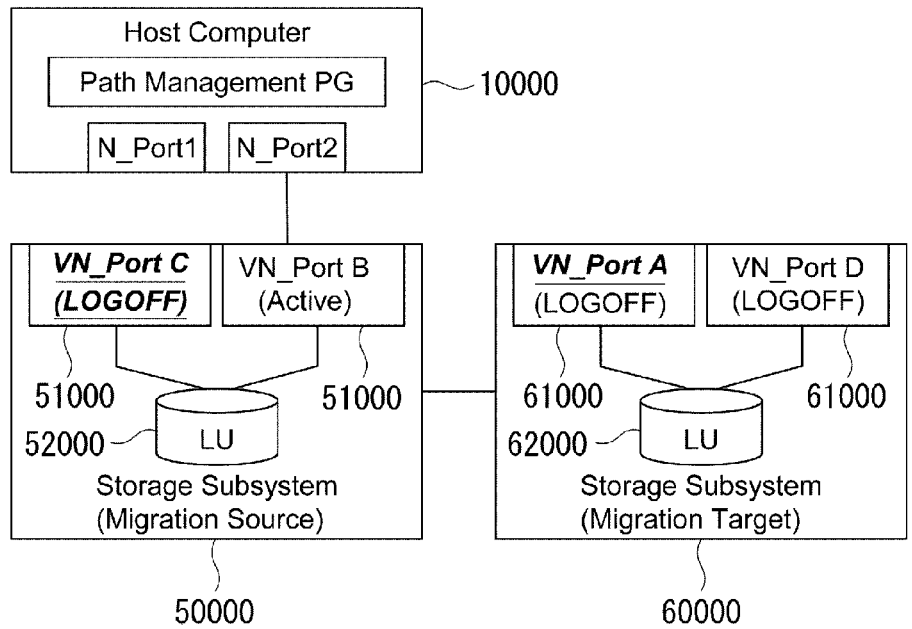
FIG. 1C is a diagram showing the outline of the first data migration method for the storage subsystem in the first embodiment.

In Phase 3 shown in FIG. 1C, the source storage subsystem 50000 makes the port with the virtual port ID VN_Port A log off from the Fabric in order to start migrating the virtual port ID. Subsequently, migration is performed so that the virtual port ID VN_Port A is switched between the source storage subsystem 50000 and the target storage subsystem 60000.

On an aside, in this embodiment, the source storage subsystem 50000 and the target storage subsystem 60000 exchange their virtual port IDs (VN_Port A and VN_Port C) with each other; however, instead of such exchange, the source storage subsystem 50000 may set a new virtual port ID.

Figure 1D:
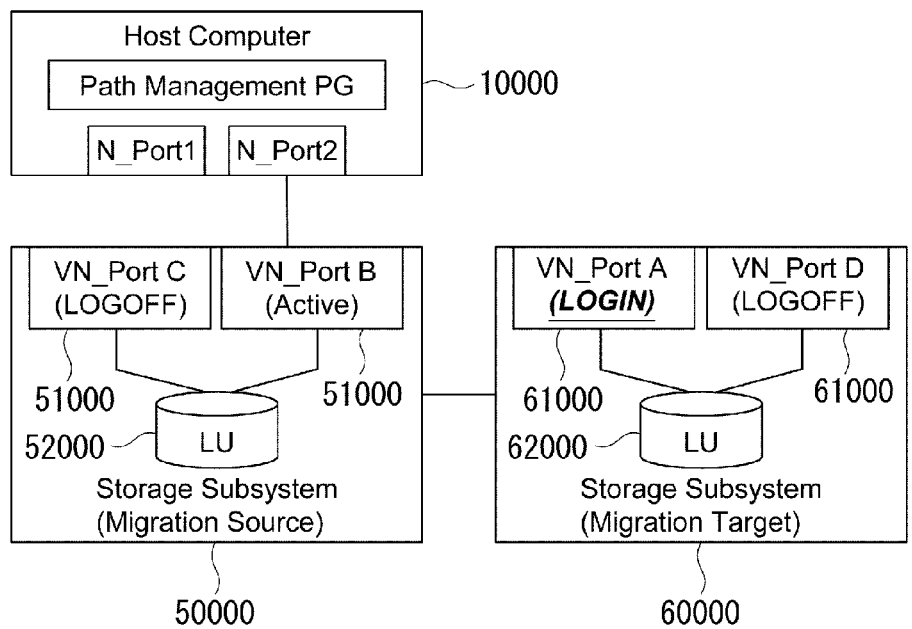
FIG. 1D is a diagram showing the outline of the first data migration method for the storage subsystem in the first embodiment.

Next, in Phase 4 shown in FIG. 1D, the target storage subsystem 60000, which took over the virtual port ID VN_Port A in Phase 3, makes the port, which took over the virtual port ID VN_Port A, logged in the Fabric.

Figure 1E:
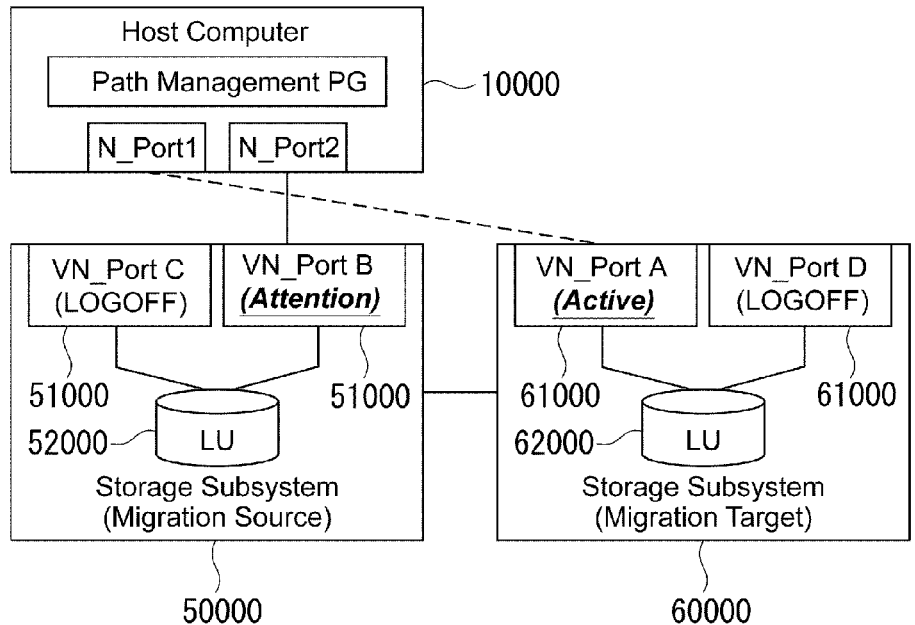
FIG. 1E is a diagram showing the outline of the first data migration method for the storage subsystem in the first embodiment.

Then, in Phase 5 shown in FIG. 1E, this target storage subsystem 60000 has the ALUA status of the port, which took over the virtual port ID VN_Port A, make the transition to a state capable of I/O access (Active) and sets a state where an access path from the host computer 10000 to the logical unit 62000 exists. However, if the computer system stays in that state, the host computer 10000 cannot issue I/O to the port of the target storage subsystem 60000 which took over the virtual port ID VN_Port A. Therefore, the source storage subsystem 50000 sends notice (Attention) from the port, which is assigned the virtual port ID VN_Port B, to the host computer 10000 that the access path to the logical unit 62000 has been added.

Figure 1F:
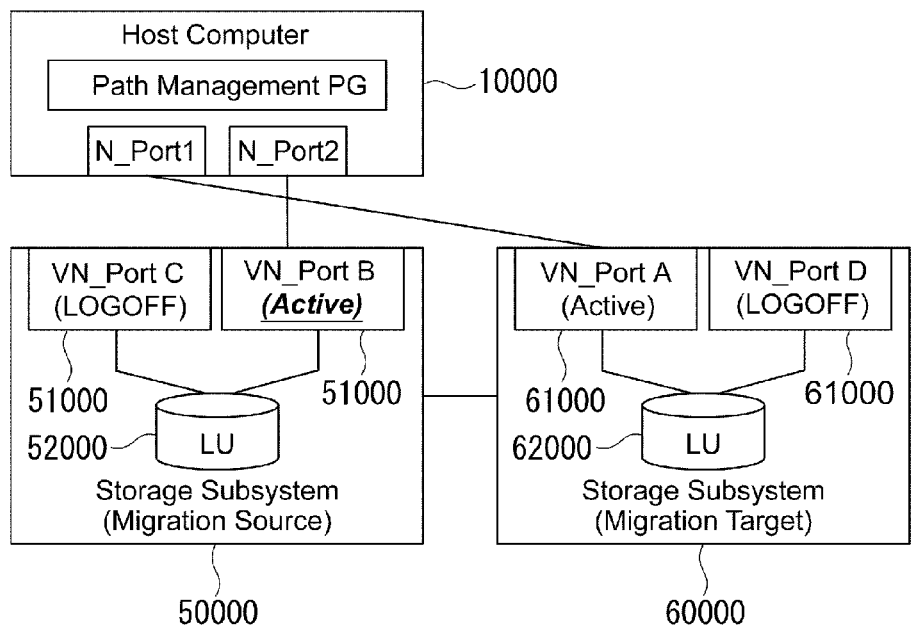
FIG. 1F is a diagram showing the outline of the first data migration method for the storage subsystem in the first embodiment.

Next, in Phase 6 shown in FIG. 1F, as a result of reception of this notice (Attention), the host computer 10000 recognizes the port with the virtual port ID VN_Port A for the target storage subsystem 60000 as an Active state and starts issuing I/O. As a result of the above, the aforementioned migration of the virtual port ID VN_Port A is completed.

The outline of the data migration system according to the first embodiment has been described above. A system configuration, data migration processing, and specific examples of the data migration processing will be explained below. The following specific examples will be explained by using FIGS. 2 to 12.

(1-2) System Configuration

Figure 2:
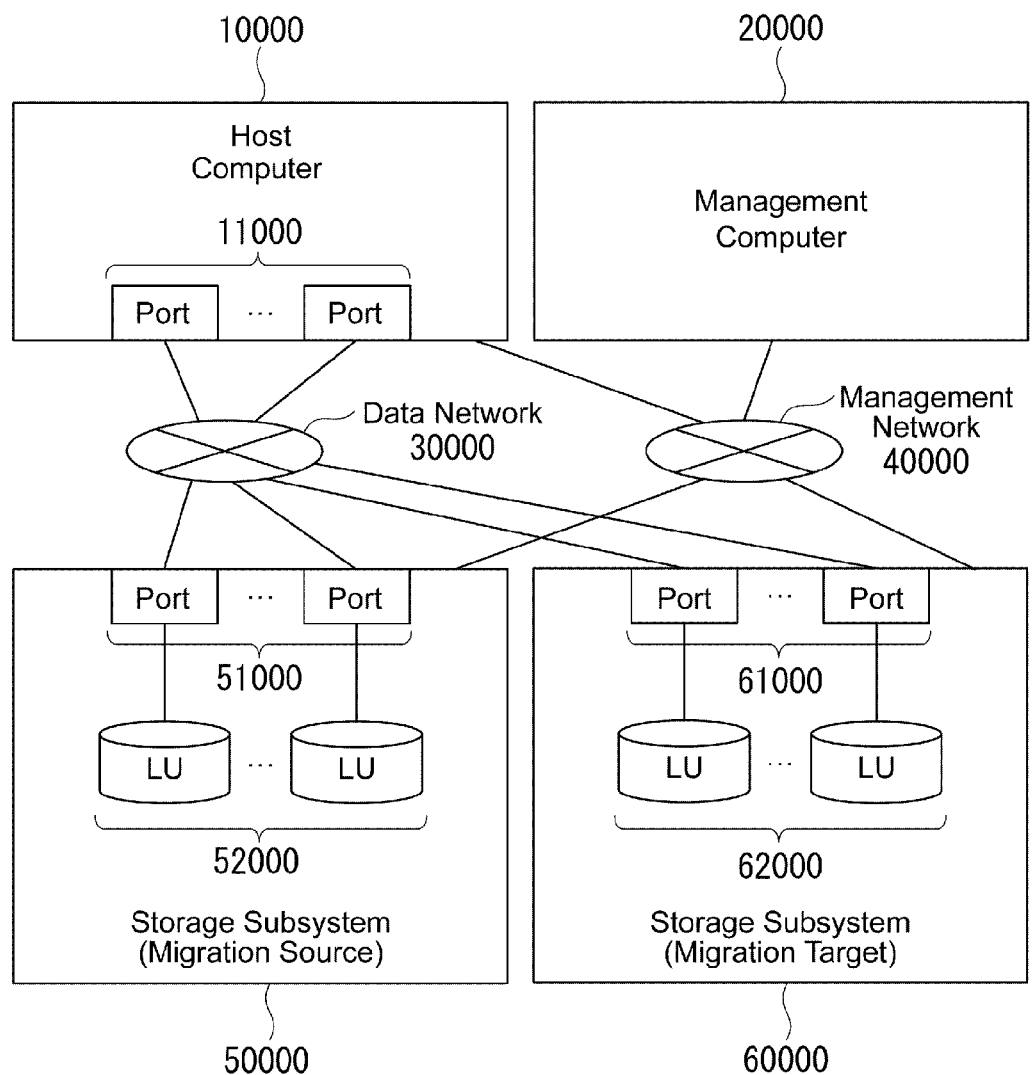
FIG. 2 is a diagram showing the configuration of a computer system in the first embodiment.

FIG. 2 shows a configuration example of a computer system according to the first embodiment. This computer system includes the host computer 10000, a management computer 20000, the source storage subsystem 50000, and the target storage subsystem 60000.

The host computer 10000, the source storage subsystem 50000, and the target storage subsystem 60000 are coupled respectively via a data network 30000 for the purpose of I/O access. Furthermore, the host computer 10000, the source storage subsystem 50000, and the target storage subsystem 60000 are coupled respectively via a management network 40000 for the purpose of information communication such as data migration processing.

(1-2-1) Host Computer

Figure 3:
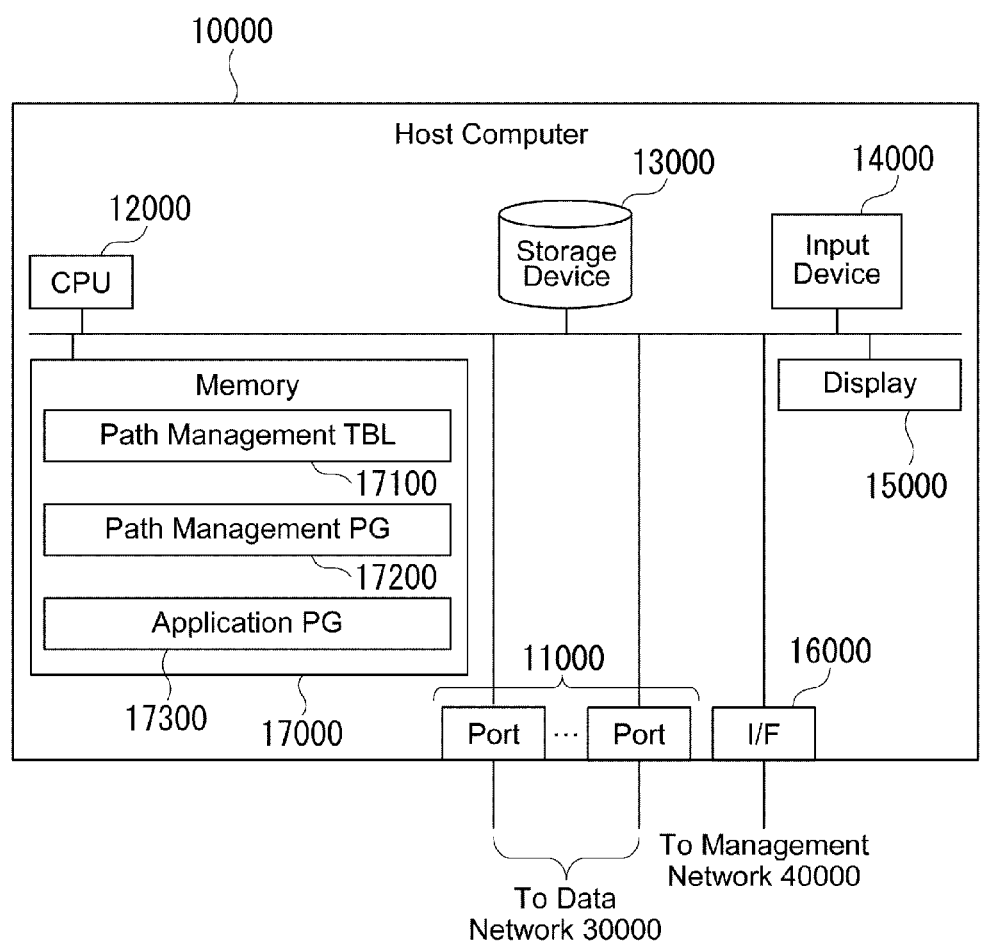
FIG. 3 is a diagram showing the configuration of a host computer in the first embodiment.

FIG. 3 shows a configuration example of the host computer 10000 as shown in FIG. 2. The host computer 10000 includes a plurality of ports 11000, a CPU 12000, a storage device 13000, an input device 14000, an output device 15000, a management interface 16000, and a memory 17000. These components such as the plurality of ports 11000 are coupled to each other.

The ports 11000 are ports for coupling the host computer 10000 to the data network 30000. The CPU 12000 controls the operation of the entire host computer 10000 and reads various tables and programs, which are stored in the storage device 13000 (and will be explained later in detail), to the memory 17000 and executes them. The storage device 13000 is, for example, a hard disk device and stores various tables and programs. The input device 14000 includes, for example, a keyboard and a mouse.

The output device 15000 is, for example, a display. The management interface 16000 couples the host computer 10000 to the management network 20000. The memory 17000 stores a path management program 17200 for realizing the Multipath I/O function, and a path management table 17100 and application programs 17300 used by the path management program to manage the ALUA status of each access path. Details of the path management table 17100 will be explained later.

Figures 4, 5:
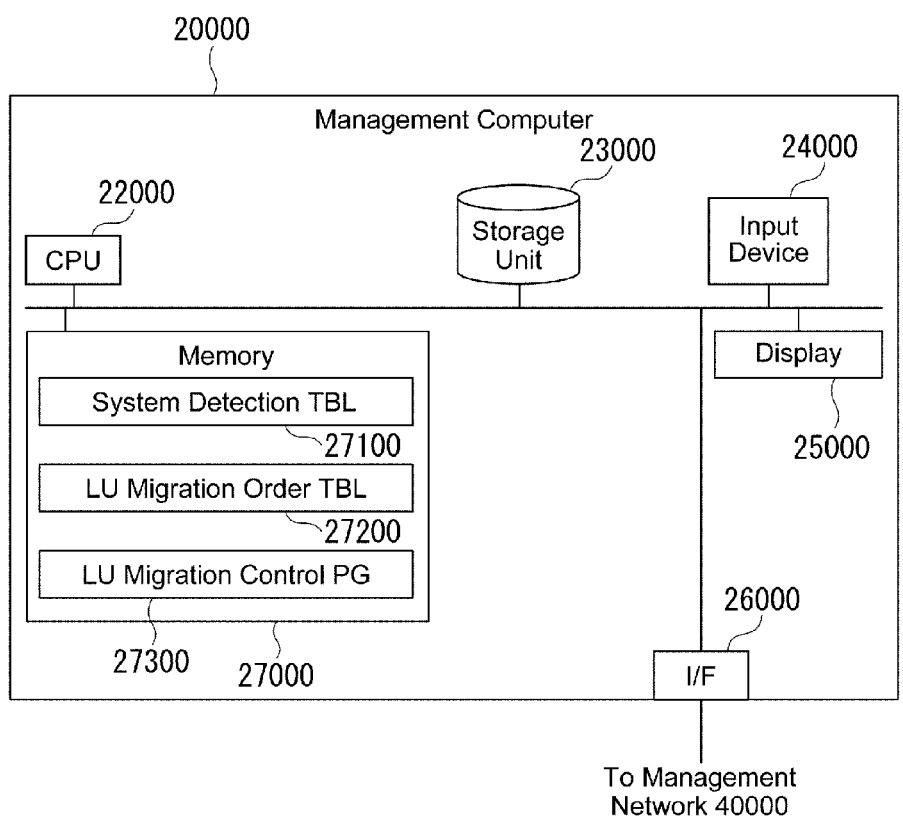
FIG. 4 is a diagram showing the configuration of a path management table belonging to the host computer in the first embodiment.
FIG. 5 is a diagram showing the configuration of a management computer in the first embodiment.

FIG. 4 shows a configuration example of the path management table 17100 shown in FIG. 2. This path management table 17100 is mounted in the host computer 10000. The path management table 17100 is a table used by the path management program 17200 in order to manage the ALUA status of each access path. The path management table 17100 includes, as fields, a logical unit name 17110, an LU ID 17115, a path ID 17120, a host port name 17130, which is a port name of the host computer, a host port ID (N_Port ID) 17135, which is a unique identifier of the port of the host computer 10000 on the Fabric, and an ALUA status 17140 which shows the ALUA status of each access path.

The LU ID 17115 is information used by the host computer 10000 to identify the relevant logical unit and includes, for example, an ASCII character string that can be obtained in Device Identification VPD (Vital Product Data) Page0x80 and Page0x83 for SCSI Inquiry commands. There are three kinds of the ALUA status 17140: an online state where I/O access can be used (Active); an online state where I/O access cannot be used (Unavailable); and an offline state (Offline). For example, FIG. 4 shows that a total of three paths, one access path for each of an Active state, an Unavailable state, and an Offline state, exist for a logical unit whose LU name 17110 is LU1. Furthermore, FIG. 4 also shows that two paths in an Active state exist for a logical unit whose LU name 17110 is LU2.

(1-2-2) Management Computer

FIG. 5 is a diagram showing a configuration example of the management computer 20000 shown in FIG. 2. The management computer 20000 includes a CPU 22000, a storage unit 23000, an input device 24000, an output device 25000, a management interface 26000 and a memory 27000. These components including the CPU 22000 are coupled to each other.

The CPU 22000 controls the operation of the entire management computer and reads various tables and programs, which are stored in the storage unit 23000, to the memory 17000 and executes them. The details of the programs and others will be explained later in detail. The storage unit 23000 is, for example, a hard disk device and stores various tables and programs. The input device 24000 includes, for example, a keyboard and a mouse. The output device 25000 is, for example, a display. The management interface 26000 couples the management computer 20000 to the management network 40000.

The memory 27000 stores a system detection table 27100, an LU migration order table 27200, and an LU migration control program 27300. The system detection table 27100 is a table used by the management computer 20000 to identify its management targets, that is, the host computer 10000 and the source and target storage subsystems 50000 and 60000. The LU migration order table 27200 is a table for managing the migration order and migration status of access paths. The LU migration control program 27300 controls access path migration processing. The details of the above tables and program will be explained later.

(1-2-2) Management Computer

FIG. 6 shows a configuration example of the system detection table 27100 belonging to the management computer 10000 as shown in FIG. 2. The system detection table 27100 includes, as fields, a system name 27110, a system type 27120, and an IP address 27130 for communication of, for example, each system, configuration information (tables), and processing instructions. For example, FIG. 6 shows that one host computer and two storage subsystems are management targets.

FIG. 7 is a diagram showing the configuration of the LU migration order table 27200 belonging to the management computer 10000 as shown in FIG. 2. The LU migration order table 27200 includes, as fields, a migration order 27210, a host name 27220, an LU name 27223, a host port name 27225, a source storage subsystem name 27230, a source storage port name 27240, a target storage subsystem name 27250, a target storage port name 27260, and a migration status 27270.

As the migration status 27270, there are: a state indicative of completion of migration processing (Done); a state indicating that the migration processing is being executed (In Progress); and a state indicating that the migration processing has not been completed (N/A [Not Applicable]). For example, FIG. 7 shows that three migration targets exist and processing of migration order #1 is completed; processing of migration order #2 is being executed; and processing of migration order #3 has not been completed.

(1-2-3) Storage Subsystem

Figure 8:
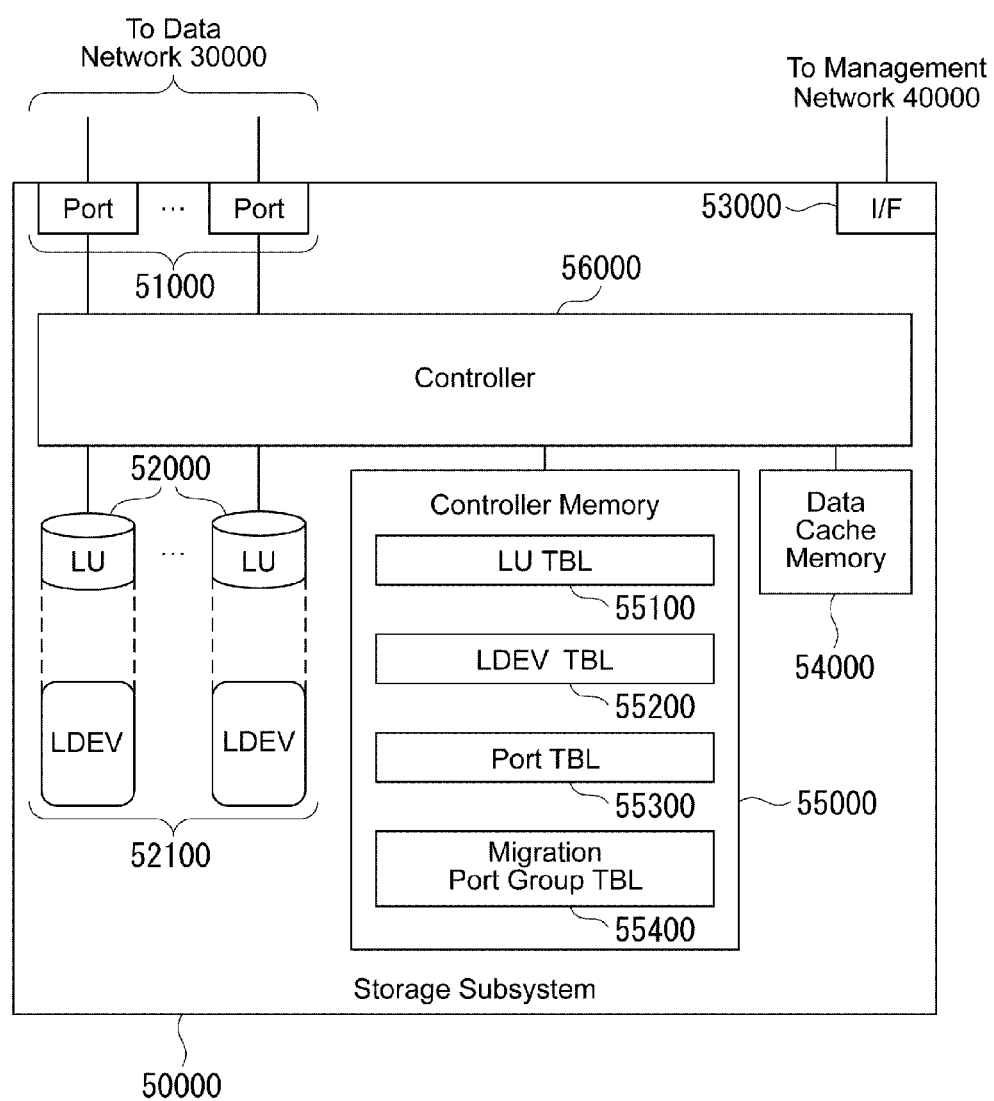
FIG. 8 is a diagram showing the configuration of a storage subsystem in the first embodiment.

FIG. 8 shows the configuration of the source storage subsystem 50000 shown in FIG. 2. An explanation will be given below by taking the source storage subsystem 50000 as an example; however, the configuration of the target storage subsystem 60000 is similar to that of the source storage subsystem 50000, so that an explanation of the target storage subsystem 60000 has been omitted here, except any difference between them.

The source storage subsystem 50000 includes a plurality of ports 51000, logical units (LUs: Logical Units) 52000, logical devices LDEVs (Logical DEVices) 52100, a management interface 53000, a data cache memory 54000, a control memory 55000, and a controller 56000. These components including the plurality of ports 51000 are coupled to each other via the controller 56000.

The port 51000 couples the source storage subsystem 50000 to the data network 30000. The logical unit 52000 is a storage area designated when an initiator sends a read/write command to a target according to a SCSI protocol.

The LDEV 52100 is a data storage unit in the source storage subsystem 50000; and may be composed of at least one hard disk drive or may be composed of a logical unit of another storage subsystem connected to the storage subsystem itself (the source storage subsystem 50000) by the technique disclosed in U.S. Pat. No. 7,051,121 (hereinafter referred to the external storage subsystem connection technique).

In this embodiment, the correspondence relationship between a logical unit and a logical device is not particularly specified; however, for ease of explanation below, one logical unit and one logical device (LDEV) are defined to correspond with each other. The management interface 53000 is an interface for coupling the source and target storage subsystems 50000 and 60000 to the management network 40000. The data cache memory 54000 is a buffer for data I/O from the host computer 10000 to the logical units provided by the source storage subsystem 50000.

The control memory 55000 stores an LU table 55100 for managing logical units, an LDEV table 55200 for managing LDEVs and an LDEV data migration status, a port table 55300 for managing ports, and a migration port group table 55400 for managing a port migration status. The details of these tables will be explained later. The controller 56000 controls the operation of the entire storage subsystem, reads various tables, which are stored in a control storage device (not shown in the drawing), and control programs of the storage subsystem (not shown) to the control memory 55000, and executes them.

FIG. 9 shows a configuration example of the LU table 55100 belonging to the storage subsystem 50000 shown in FIG. 8. The LU table 55100 includes, as fields, an LU name 55110, an access target port name 55120, a physical port ID 55130, a virtual port ID 55140, a physical LDEV ID 55150 (as mentioned as a physical LU ID in the drawing), a virtual storage subsystem name 55155, and a virtual LDEV ID 55160.

The access target port name 55120 indicates a port name of an access target when the relevant logical unit can be read or written from the host computer 10000. The physical port ID 55130 is an identifier of a physical port, which is a unique identifier of the port in the storage subsystem. The virtual port ID 55140 is an identifier of a virtual port in accordance with N_Port ID Virtualization (NPIV) standards for ASNI T11. The physical LDEV ID 55150 is an identifier of a physical LDEV, which is a unique identifier of the LDEV corresponding to the logical unit in the storage subsystem. The virtual LDEV ID 55160 is an identifier of a virtual LDEV, which is a unique identifier in a plurality of storage subsystems. The LU name 55110, the port name 55120, and the physical port ID 55130 are respectively uniquely identifiable values in the relevant storage subsystem and are assigned in advance at the time of setting of the storage subsystem.

On the other hand, the virtual port ID 55140, the virtual storage subsystem name 55155, and the virtual LDEV ID (corresponding to the virtual LU ID mentioned above) 55160 are unique identifiers in both the source storage subsystem 50000 and the target storage subsystem 60000 of the data migration system according to this embodiment and assigned by, for example, the administrator or the management computer 20000 by the migration processing described later.

The virtual port ID 55140 is a virtually assigned identifier to identify a virtual port of the source storage subsystem 50000 and a virtual port of the target storage subsystem 60000 as the same port on the Fabric. The virtual storage subsystem name 55155 and the virtual LDEV ID 55160 are information used to have the host computer 10000 create an ASCII character string which serves as information for identifying a logical unit with an Inquiry command corresponding to the SCSI standard, as explained earlier with respect to the LU ID 17115 which is the field shown in FIG. 4. Specifically speaking, in response to a SCSI Inquiry command from the host computer 10000, an ASCII character string created by connecting the virtual storage subsystem name 55155 and the virtual LDEV ID 55160 (for example, VST01VV1 by connecting VST01 and VV1) is responded.

FIG. 10 shows a configuration example of the LDEV table 55200 belonging to the storage subsystem 50000 as shown in FIG. 8. The LDEV table 55200 includes, as fields, a physical LDEV ID 55210, a device 55220, a cache mode 55230, and an LDEV migration status 55240. If the device 55220 is composed of at least one hard disk drive in the relevant storage subsystem, a group name of the hard disk drive(s) (such as HDD Group in an example shown in the drawing) is registered. On the other hand, if an LDEV is configured by the external storage subsystem connection technique, the device name and the logical unit name of another storage subsystem are registered.

The cache mode is a flag for setting whether the data cache memory 54000 which serves as a data I/O buffer for processing for writing data from the host computer 10000 to an LU associated with the relevant LDEV should be used for Write Back or Write Through.

If the cache mode is ON, the data cache memory 54000 will be used. Specifically speaking, regarding the processing for writing data from the host computer 10000 to the relevant LDEV 52100, Cache Coherency control between the data cache memory 54000 and the relevant LDEV 52100 is Write Back processing.

On the other hand, if the cache mode is OFF, the data cache memory 54000 will not be used. Specifically speaking, regarding the processing for writing data from the host computer 10000 to the relevant LDEV 52100, Cache Coherency control between the data cache memory 54000 and the relevant LDEV 52100 is Write Through processing.

The LDEV migration status 55240 is a field indicating whether the relevant LDEV 52100 is a data migration source (as mentioned as Copy Source in the drawing) or a data migration target (as mentioned as Copy Target in the drawing) for the data migration processing described later. Regarding an LDEV having no relationship with the data migration processing, N/A (Not Applicable) is registered.

Figure 11:
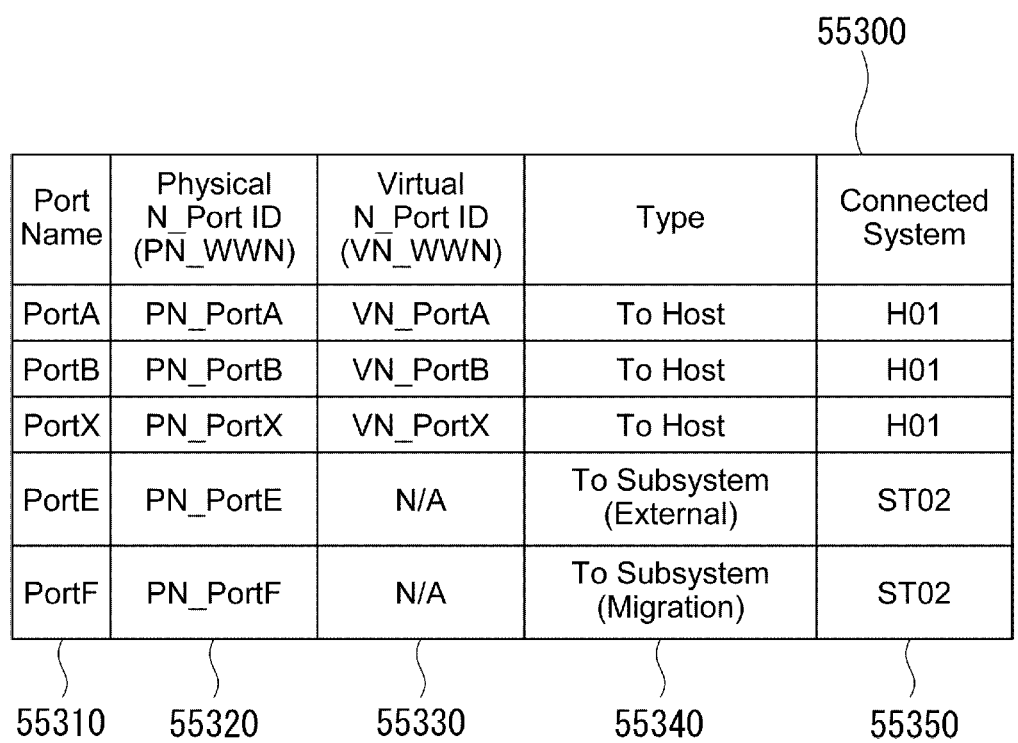
FIG. 11 is a diagram showing the configuration of a port table belonging to the storage subsystem in the first embodiment.

FIG. 11 shows a configuration example of the port table 55300 belonging to the storage subsystem 50000 shown in FIG. 8. The port table 55300 includes, as fields, a port name 55310, a physical port ID 55320 which is a unique identifier of the port in the storage subsystem, a virtual port ID 55330 in accordance with, for example, the N_Port ID Virtualization (NPIV) for ASNI T11, a port type 55340, and a connected system name 55350. On an aside, since the port name 55310, the physical port ID 55320, and the virtual port ID 55330 have already been explained, their explanation is omitted here.

The port type (Port Type) 55340 indicates whether the port is used for I/O access with the host computer 10000 (as mentioned as To Host in the drawing) or for the external storage subsystem connection technique (as mentioned as To Subsystem (External) in the drawing), or for the migration processing described later (as mentioned as To Subsystem (Migration) in the drawing). On an aside, in this embodiment, one port corresponds to only one type for ease of explanation; however, instead of this one-to-one correspondence, a certain port may correspond to a plurality of types. The connected system name 55350 is a field for registering the name assigned to the host computer 10000 or the storage subsystem 50000, 60000 which is the connected system.

FIG. 12 shows a configuration example of the migration port group table 55400 belonging to the storage subsystem 50000 shown in FIG. 8. The migration port group table 55400 is a table for registering all ports of the source storage subsystem 50000 and the target storage subsystem 60000, which are defined as I/O access paths for migration target LUs when executing the data migration processing described later, and for managing a migration status of such ports.

This migration port group table 55400 is provided in each of the source storage subsystem 50000 and the target storage subsystem 60000. The source storage subsystem 50000 and the target storage subsystem 60000 are configured so that they communicate each other so as to make a value of a table entry coincide with each other during the data migration processing described later. The details thereof will be explained later.

The migration port group table 55400 includes, as fields, an identifier group ID 55410 capable of uniquely identifying a group of logical units, which is a migration target, a virtual storage subsystem name 55145 of the migration target logical unit, a virtual LDEV ID (as mentioned as Virtual LU ID in the drawing) 55420, a storage subsystem name 55430 to which the migration target logical unit belongs, an LU name 55440 in that storage subsystem, a physical LDEV ID (as mentioned as Physical LU ID in the drawing) 55441, a port name 55450, a physical port ID 55451, a virtual port ID 55452, a Fabric status 55460 of the port, an ALUA status 55461 of the port, and a port role 55470.

Since the fields from the aforementioned identifier group ID 55400 to the virtual port ID 55452 have already been explained, their explanation is omitted here. The Fabric status 55460 indicates whether the relevant port is logged in the Fabric (LOGIN) or the relevant port is logged off from the Fabric (LOGOFF). The ALUA status 55461 indicates whether the relevant port is in an online state capable of using I/O access (Active), in an online state incapable of using I/O access (Unavailable), or in an offline state (OFFLINE).

Therefore, a possible combination of the Fabric status and the ALUA status is LOGIN and Active, LOGIN and Unavailable, LOGIN and OFFLINE, or LOGOFF and OFFLINE. The port role 5540 indicates whether the relevant port is, during the data migration processing described later, a source port (Source), a target port (Target), or in an Active state always capable of I/O access during the migration processing because the port has nothing to do with the migration processing (Active). On an aside, in the first embodiment, the management computer 20000 has been described as a device provided separately from the host computer 10000, the source storage subsystem 50000 or the target storage subsystem 60000; however, this embodiment is not limited to such a system configuration and the management computer 20000 may be mounted in any of the host computer 10000 and other systems mentioned above.

(1-2-4) Variations

On an aside, with the computer system according to this embodiment, for example, the tables and programs which are mounted in the management computer 20000 may be mounted in the host computer 10000 and the host computer 10000 having such a configuration may execute the processing described later. Specifically speaking, the computer system according to this embodiment may have a system configuration in which the management computer 20000 does not exist. On the other hand, with the computer system according to this embodiment, the tables and programs mounted in the management computer 20000 may be mounted in the source storage subsystem 50000 and this source storage subsystem 50000 may execute the processing described later. In other woods, the computer system according to this embodiment may have a system configuration in which the management computer 20000 does not exist. Furthermore, with the computer system according to this embodiment, for example, the tables and programs mounted in the management computer 20000 may be mounted in the target storage subsystem 60000 and this target storage subsystem 60000 may execute the processing described later. In other woods, the computer system according to this embodiment may have a system configuration in which the management computer 20000 does not exist.

(1-3) Data Migration Processing

Next, data migration processing according to the first embodiment will be explained, using FIGS. 13 and 14. FIG. 13 is a flowchart showing an example of processing executed by the LU migration control program 27300 mounted in the management computer 20000 shown in FIG. 5 or of having such LU migration control program 27300 execute the processing.

Firstly, with the management computer 20000, the LU migration control program 27300 specifies a migration target logical unit 52000 of the source storage subsystem 50000 (S13000). On an aside, regarding this specification method, instead of the above specification, the storage administrator may designate the logical unit 52000 of the source storage subsystem 50000 by using, for example, GUI or may specify a logical unit 62000 of the source storage subsystem 60000 by designating a logical unit (not shown in the drawing) of the host computer 10000.

Next, the LU migration control program 27300 creates the migration target logical unit 62000 in the target storage subsystem 60000 (S13010). On an aside, the target storage subsystem 60000 may be designated by the storage administrator, using, for example, the GUI. Instead of this method, this LU migration control program 27300 may refer to the port table 55300 of the source storage subsystem 50000 and determine a storage system coupled to the source storage subsystem 50000 to be the target storage subsystem 60000.

If the LU migration control program 27300 determines the target storage subsystem 60000, the management computer 20000 creates a new entry of a migration target LDEV (corresponding to the migration target logical unit) in the LDEV table 55200 of the target storage subsystem 60000 and defines a device of that migration target LDEV as a device of the migration source logical unit 52000 of the source storage subsystem 50000. Furthermore, the LU migration control program 27300 creates a new entry of the migration target logical unit in the LU table 55100 of the target storage subsystem 60000 and defines a correspondence relationship between the port and the LDEV. The migration target LDEV created above is set to the relevant LDEV.

Next, the LU migration control program 27300 defines the same virtual identifier (virtual ID) in the migration source logical unit 52000 and the migration target logical unit 62000 (S13020). Specifically speaking, the same virtual storage subsystem name and virtual LDEV ID are set to the migration source logical unit and the migration target logical unit.

Furthermore, the LU migration control program 27300 sets the same virtual port ID to each of the plurality of ports of the migration source logical unit and the migration target logical unit. If the migration source logical unit 52000 is already used by the host computer 10000 when making such settings, the LU migration control program 27300 copies values of the virtual port ID, the virtual storage subsystem name, and the virtual LDEV ID of the migration source logical unit 52000 to the migration target logical unit 62000.

On the other hand, if the migration source logical unit 52000 is to be provided to the host computer 10000, the LU migration control program 27300 may set the values of the virtual port ID, the virtual storage subsystem name, and the virtual LDEV ID, which are designated by the storage administrator by using, for example, the GUI, to the migration source logical unit 52000 and the migration target logical unit 62000, respectively.

Next, with the management computer 20000, the LU migration control program 27300 sets the cache mode of the LDEV corresponding to the migration target logical unit to OFF (S13030). Specifically speaking, a value of the cache mode field in the LDEV table 55200 is set to OFF.

Then, with the management computer 20000, the LU migration control program 27300 creates the LU migration order table 27200 in the management computer 20000, while it creates the migration port group table 55400 in the source storage subsystem 50000 and also creates a migration port group table (not shown in the drawing) in the target storage subsystem 60000 (S13040).

Specifically speaking, the LU migration control program 27300 examines the LU ID of a host logical unit (not shown in the drawing), which has become a migration target), in order to create the LU migration order table 27200 in the management computer 20000. Next, the LU migration control program 27300 detects a logical unit in the storage subsystem, which matches with a combination of the LU ID, the virtual storage subsystem name, and the virtual LDEV ID of the host logical unit which has become the migration target, between the target storage subsystem 60000 and the source storage subsystem 50000.

If a specific logical unit is detected, the LU migration control program 27300 further detects a group of ports having the same virtual port ID (for example, a port name Port A of the source storage subsystem and a port name Port C of the target storage subsystem) with respect to all ports which are set to the detected specific logical unit. As a result, the LU migration control program 27300 changes the migration order number for each port group, thereby creating entries for the LU migration order table 27200.

For example, the LU migration control program 27300 creates all the ports, which are set to all the logical units detected to create the LU migration order table 27200, as entries corresponding to the same group ID for the migration port group table 55400 in order to create the migration port group table 55400 in the source storage subsystem 60000. If there are a plurality of host logical units which are migration targets, the LU migration control program 27300 changes the group ID for each host logical unit and repeats the preceding steps. Next, the LU migration control program 27300 repeatedly executes the processing in step S13050 to S13110 on all the logical units which are the migration targets (S13045).

Then, the LU migration control program 27300 repeatedly executes the processing in step S13055 to S13070 on all the ports of the logical units which are the migration targets (S13050). Specifically speaking, the LU migration control program 27300 executes the processing on the entry/entries, for which the migration status 27270 of the LU migration order table 27200 has not become the Done state (migration completed), and changes the migration status of such entry/entries to In Progress (Under processing).

Subsequently, with the management computer 20000, the LU migration control program 27300 sets the port role 55470 to the migration port group table 55400 of the storage subsystem (S13055). Specifically speaking, the LU migration control program 27300 uses the source storage subsystem name 27250 and the source port name 27240 of an entry, for which the migration status 27270 of the LU migration order table 27200 is In Progress, as a key, searches for an entry for which the source storage subsystem name 55430 and the source port name 55450 of the migration port group table 55400 match with the key, and finds the group ID of the matched entries.

Then, with respect to all the entries which match with the above-found group ID in the migration port group table 55400, the LU migration control program 27300 changes the port role 55470 of the entry/entries of the migration port group table 55400, which matches/match with the source storage subsystem name 55430 and the source port name 55450 of the entry/entries, for which the migration status 27270 of the LU migration order table 27200 in the management computer 20000 is In Progress, to Target.

Furthermore, with respect to all the entries which match with the above-found group ID, the LU migration control program 27300 changes the port role 55470 of the entry/entries of the migration port group table 55400, which matches/match with the target storage subsystem name 55430 and the target port name 55450 of the entry/entries, for which the migration status 27270 of the LU migration order table 27200 in the management computer 20000 is In Progress, to Source. Furthermore, with respect to all the entries which match with the above-found group ID, the LU migration control program 27300 changes the port role 55470 of the remaining entries, for which the port role 55470 has not been set to Source or Target, to Target.

Next, with the management computer 20000, the LU migration control program 27300 executes migration of the virtual port (S13060). On an aside, the details of this virtual port migration will be explained with reference to 14 described later.

Then, the LU migration control program 27300 changes the migration status 27270 of the entries of the LU migration order table 27200, for which the processing has been completed, from In Progress to Done. This LU migration control program 27300 checks if the migration of all virtual ports of a certain migration target logical unit has been completed or not, that is, whether any entry whose migration status 27270 is N/A still exists or not. If the migration has not been completed yet, the LU migration control program 27300 returns to step S13050; and if the migration is completed, the LU migration control program 27300 proceeds to step S13080 (S13070).

Next, with the management computer 20000, the LU migration control program 27300 sets the cache mode of an LDEV corresponding to the migration target logical unit to ON with respect to the target storage subsystem 60000 (S13080). Specifically speaking, a value of the cache mode field 55230 of the LDEV table 55200 is set to ON.

Subsequently, with the management computer 20000, the LU migration control program 27300 copies data between the devices with respect to the migration target logical unit of the target storage subsystem 60000 (S13090).

The migration target logical unit 62000 of the target storage subsystem 60000 is in a state where data is now being transferred to the logical unit of the source storage subsystem 50000 by read/write processing by means of, for example, the external storage connection technique. Therefore, a new LDEV composed of the hard disk drive(s) in the target storage subsystem 60000 is defined and data is copied from the LDEV corresponding to the logical unit of the source storage subsystem 50000 to the new LDEV.

When this happens, the LDEV migration status of the LDEV corresponding to the logical unit of the source storage subsystem 50000 is set to Copy Source and also the LDEV migration status of the new LDEV is set to Copy Target in order to manage the LDEV migration status 55240 of the LDEV table 55200. On an aside, the data read processing from the host computer 10000 to the logical unit composed of the LDEV, regarding which data is being copied, may be executed so that a respond may be made by reading the data from the aforementioned LDEV in a Copy Source state. Furthermore, by data write processing, the consistency of data of both the LDEVs is maintained by writing data to the respective LDEVs in a Copy Source state and a Copy Target state.

Next, with the management computer 20000, the LU migration control program 27300 executes device exchange on the migration target logical unit of the target storage subsystem 60000 (S13100). Completion of data copying executed in the aforementioned step S13090 is detected by periodical polling from the management computer 20000 to the target storage subsystem 60000 or by a message from the target storage subsystem 60000 to the management computer 20000.

After such detection, the LU migration control program 27300 of the management computer 20000 switches, relative to the migration target logical unit 62000 of the target storage subsystem 60000, the LDEV corresponding to the relevant logical unit to only an LDEV composed of the hard disk drive(s) in the target storage subsystem 60000. In this embodiment, this is called device exchange. As a result of such device exchange, data read/write processing on the logical unit 52000 of the source storage subsystem 50000 by using the external storage connection technique will not be executed in the target storage subsystem 60000. In other words, this means that the data migration from the logical unit of the source storage subsystem 50000 to the target storage subsystem 60000 is completed.

Next, the LU migration control program 27300 checks if migration of all logical units of a certain host computer 10000 has been completed or not (S13110). If the migration has not been completed, the LU migration control program 27300 returns to the aforementioned step S13045 and repeatedly executes the processing; and if the migration is completed, the LU migration control program 27300 terminates this processing.

(1-4) Ladder Charts of Data Migration Processing

Figure 14C:
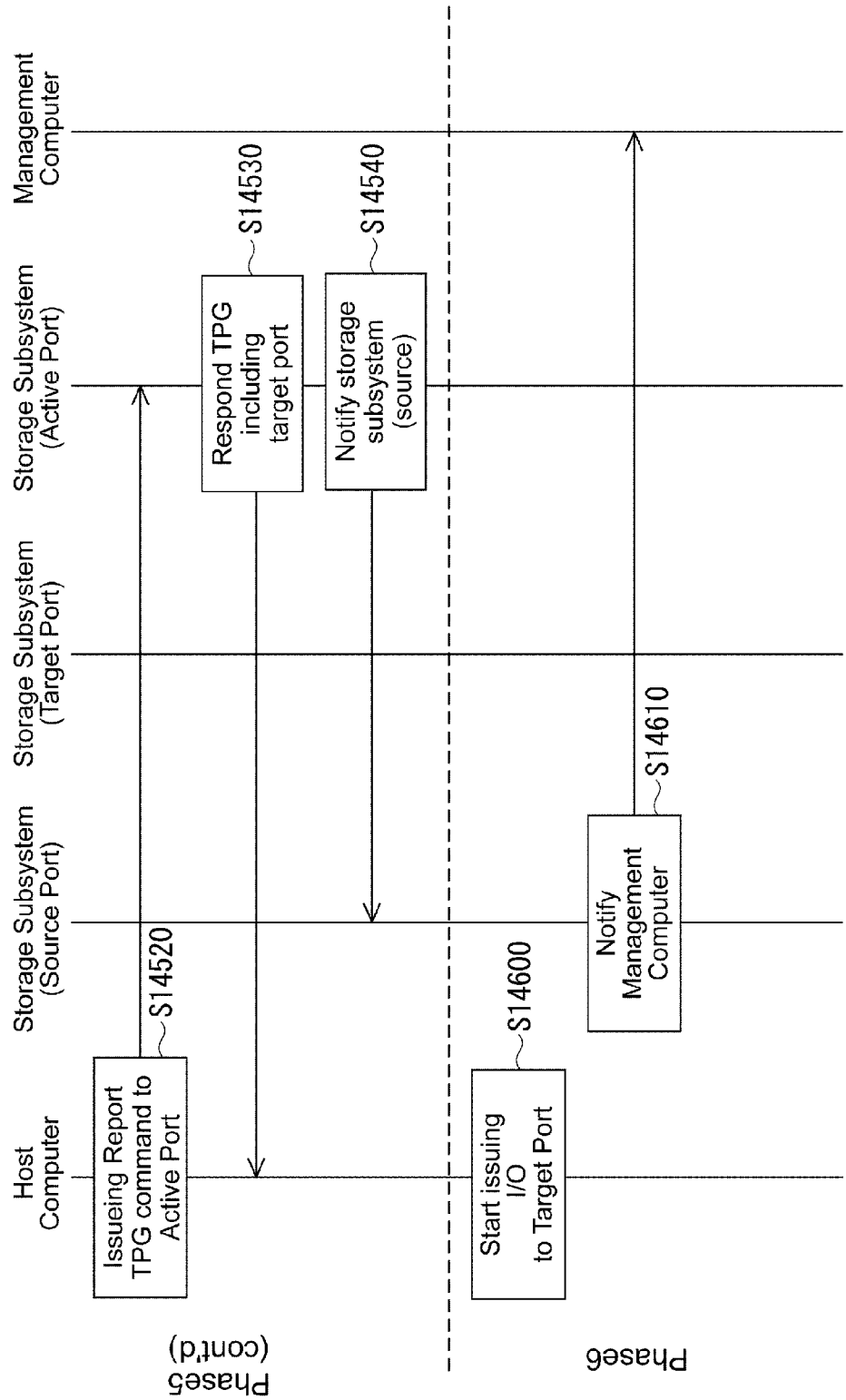
FIG. 14C is a ladder chart of processing executed by the host computer, the management computer, the source storage subsystem, and the target storage subsystem, respectively, during LU migration in the first embodiment.

Each of FIG. 14A to 14C is a ladder chart showing an example of processing executed by the host computer 10000, the management computer 20000, the source storage subsystem 50000, and the target storage subsystem 60000, respectively, for LU migration according to the first embodiment. The ladder charts will be explained below in accordance with each phase defined in the outline of the data migration system according to the first embodiment as illustrated in FIG. 1A to 1F.

Firstly, in Phase 1 shown in FIG. 14A, the management computer 20000 issues an instruction to the source storage subsystem 50000 equipped with a migration-source virtual port to migrate the port (S14100).

Next, in Phase 2, the source storage subsystem 50000 which has received the above instruction changes the ALUA status of the source port, that is, the port for which the port role 55470 of the migration port group table 55400 is Source, to Unavailable (S14200). As a result, even if the host computer 10000 issues I/O access to the source port, the ALUA status is Unavailable, so that the host computer 10000 reissues I/O to another port whose ALUA status is Active (S14210).

Then, the host computer 10000, which detected the source port whose ALUA status is Unavailable, issues a Report TPG (Target Port Group) command according to the SCSI standard to another port whose ALUA status is Active so that notice should be sent from the storage subsystem to report which port is in an Active ALUA status (S14220).

Subsequently, the storage subsystem, which received the Report TPG command according to the SCSI standard and has the port whose ALUA status is Active, responds a migration port group (hereinafter referred to as TPG) composed of all ports whose port role in the migration port group table is Active (S14230).

Next, the storage subsystem having the port whose ALUA status is Active notifies the source storage subsystem 50000 that the next phase should be proceeded (S14240). On an aside, the host computer 10000 which received the Report TPG in the above step S14230 will not issue I/O to the source port of the source storage subsystem 50000 after this reception. This is because the source port of the source storage subsystem 50000 is not included in that TPG, so that the host computer 10000 will no longer transfer data to the source port of the source storage subsystem 50000 on the basis of this TPG after that.

Next, in Phase 3 shown in FIG. 14B, the source storage subsystem 60000 which received the above notice, changes the ALUA status 55461 of the source port, that is, the port for which the port role 55470 of the migration port group table 55400 is Source, to Offline (S14300). After the change to Offline is completed, the source storage subsystem 50000 makes the source port log off from the Fabric and changes the Fabric status of the migration port group table 55400 to LOGOFF (S14310).

After the change to LOGOFF is completed, the source storage subsystem 50000 and the target storage subsystem 60000 exchange the virtual port IDs of the source port and the target port with each other (S14320). After the execution of this step S14320 is completed, the virtual port ID of the source port becomes the virtual port ID of the target port. On an aside, in this Phase 3, the host computer 10000 issues I/O to all ports whose port role 55470 is Active, so that the I/O continues.

Next, in Phase 4, the target storage subsystem 60000, which has completed exchanging the virtual port IDs of the source port and the target port, makes the target port logged in the Fabric and also changes the Fabric status 55460 of the migration port group table 55400 to LOGIN (S14400).

Then, in Phase 5, the target storage subsystem 60000, which has completed making the target port logged in the Fabric, changes the ALUA status 55461 of the target port to Active (S14500). As a result, the target storage subsystem 60000 can receive I/O access via the target port.

However, if the computer system stays in that state, the host computer 10000 cannot issue I/O to the target port of the target storage subsystem 60000 because the target port of the target storage subsystem 60000 is not included in the TPG.

Therefore, the target storage subsystem 60000 notifies the source storage subsystem 50000, the target storage subsystem 60000, or both the storage subsystems 50000, 60000, which has/have the port belonging to the TPG, that the ALUA status 55461 of the target port has become Active. As a result, when the host computer 10000 issues the next I/O access, the storage subsystem having the port which has received the next I/O access (hereinafter referred to as the specific storage subsystem) issues, for example, UNIT ATTENTION/ASYMMETRIC ACCESS STATE CHANGED according to the SCSI standard (hereinafter simply abbreviated as UNIT ATTENTION), as notice for updating the TPG, to the host computer 10000 (S14510).

The host computer 10000 which has received the UNIT ATTENTION issues, for example, a Report TPG command according to the SCSI standard as shown in FIG. 14C so that the storage subsystem will notify another port, whose ALUA status 55461 is Active, of which port is in an Active ALUA status 55461 (S14520).

Next, the specific storage subsystem responds the TPG from all the ports whose port role 55470 of the migration port group table 55400 is Active (S14530). When this happens, the target port of the target storage subsystem 60000 is included in the TPG. Then, the specific storage subsystem notifies the source storage subsystem 50000 that the next phase should be proceeded (S14540).

Finally, in Phase 6, the host computer 10000 which has received the response to the Report TPG from the specific storage subsystem will thereafter issue I/O by including the target port of the target storage subsystem 60000 (S14600). The source storage subsystem 50000, which has received the notice of completion of the response to the Report TPG, notifies the management computer 20000 that the port migration has been completed (S14610).

(1-4) Specific Application Examples of Data Migration Processing

Next, specific application examples of the data migration processing according to the first embodiment will be explained.

Figure 15A:
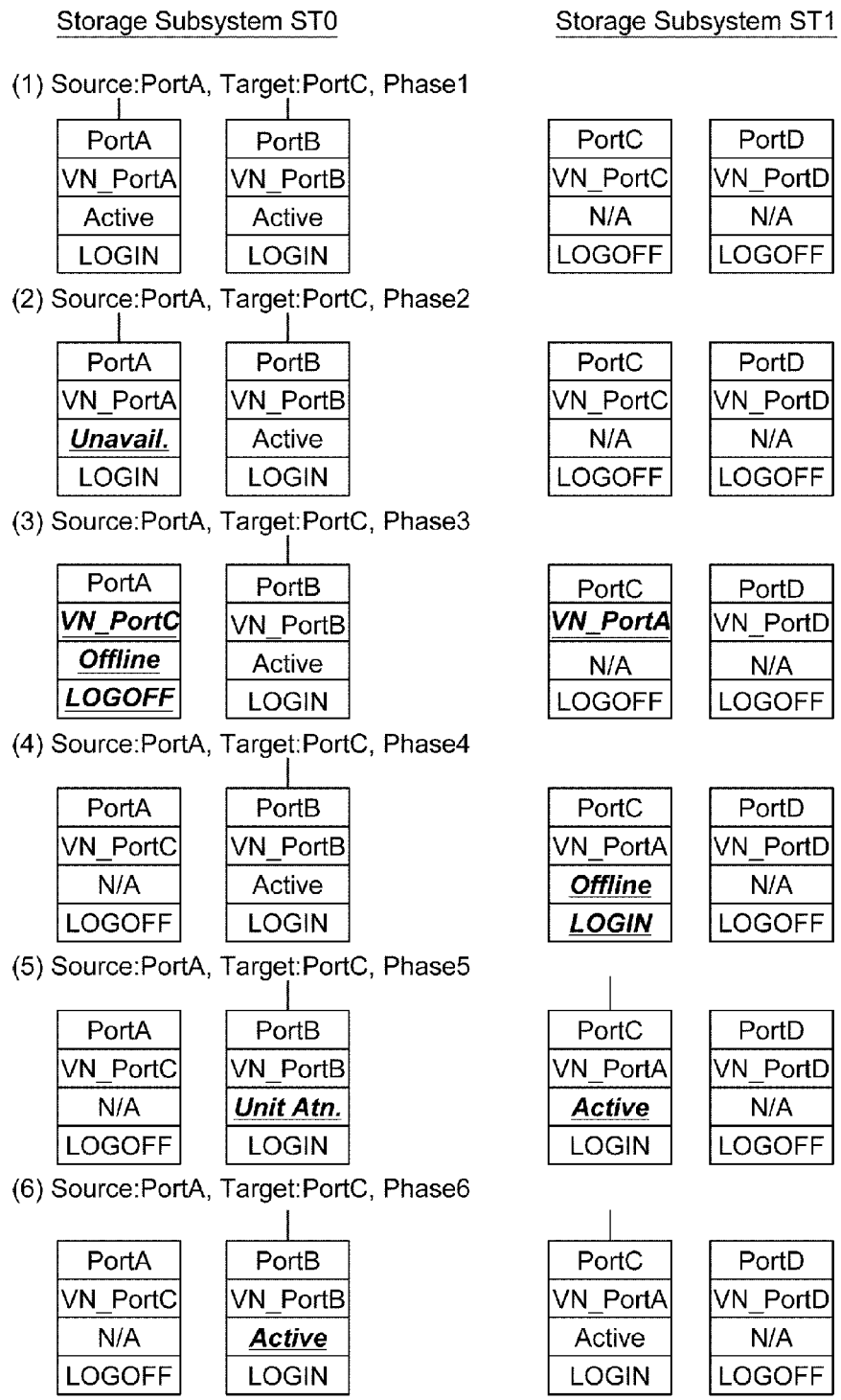
FIG. 15A a diagram specifically showing a port status transition when the LU migration control program is applied to migration of two active ports in the first embodiment.
Figure 15B:
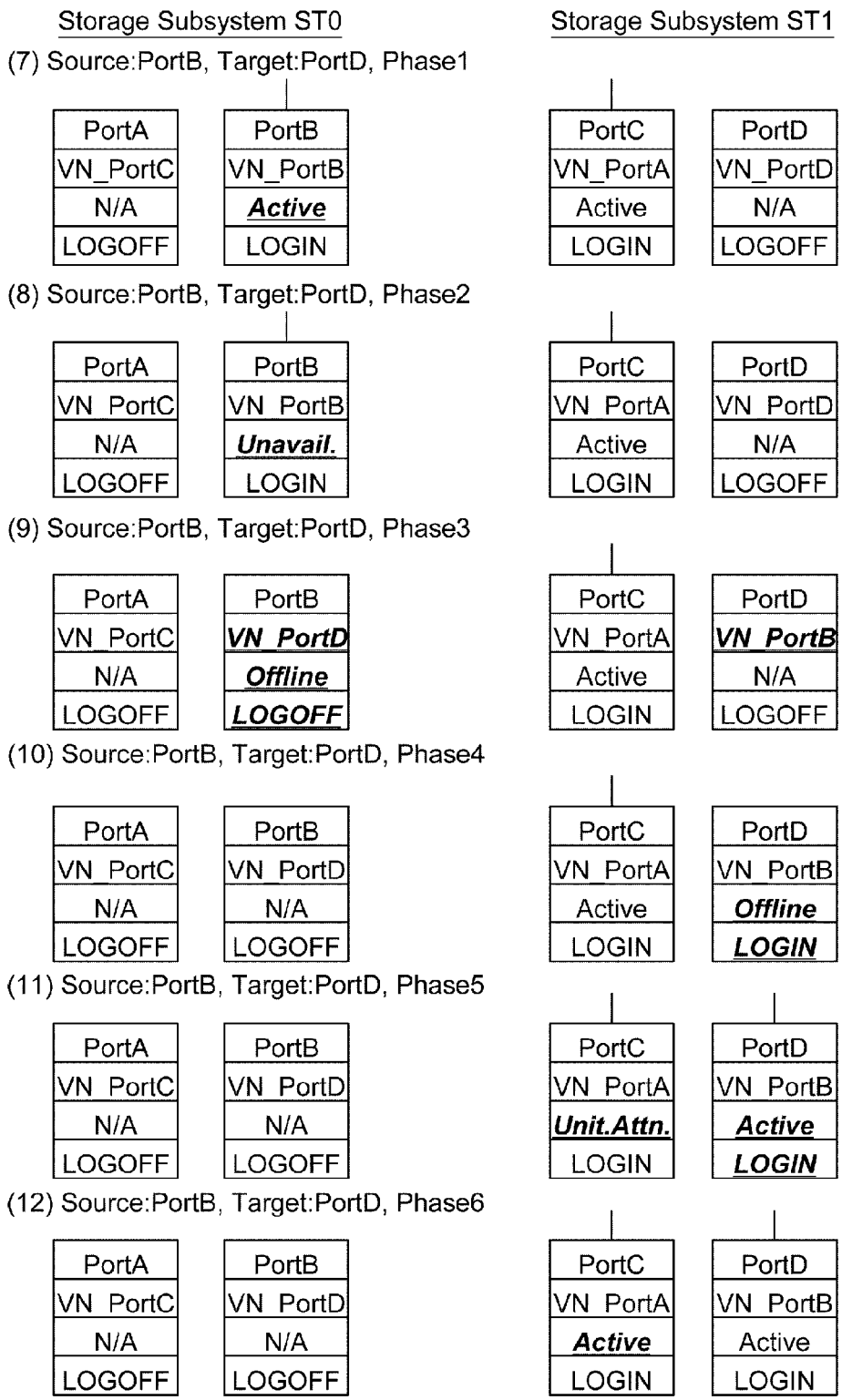
FIG. 15B a diagram specifically showing a port status transition when the LU migration control program is applied to migration of two active ports in the first embodiment.
Figure 16A:
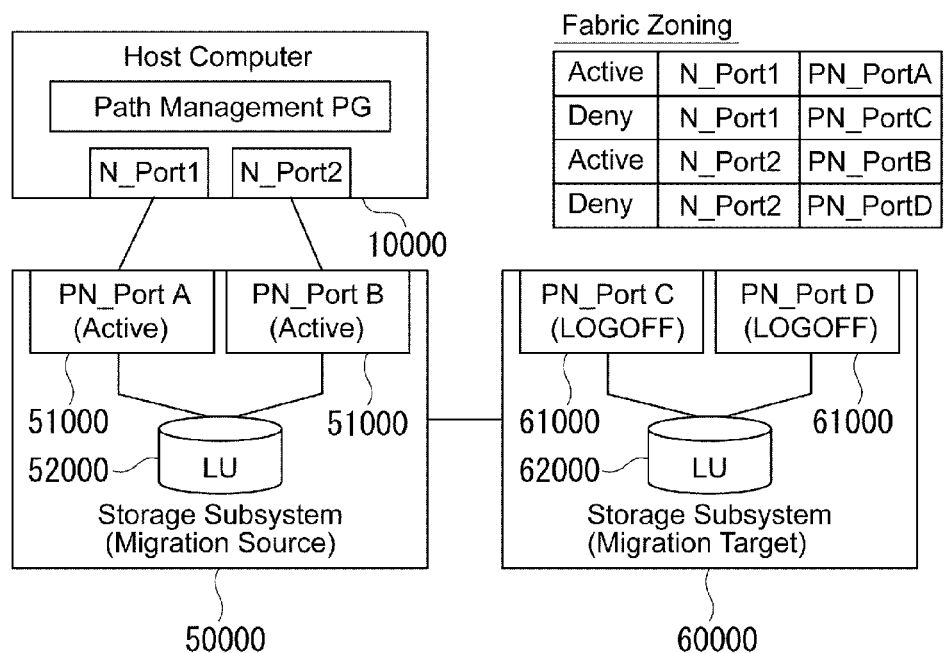
FIG. 16A is a diagram showing the outline of a second data migration method of a storage subsystem according to a second embodiment.
Figure 16B:
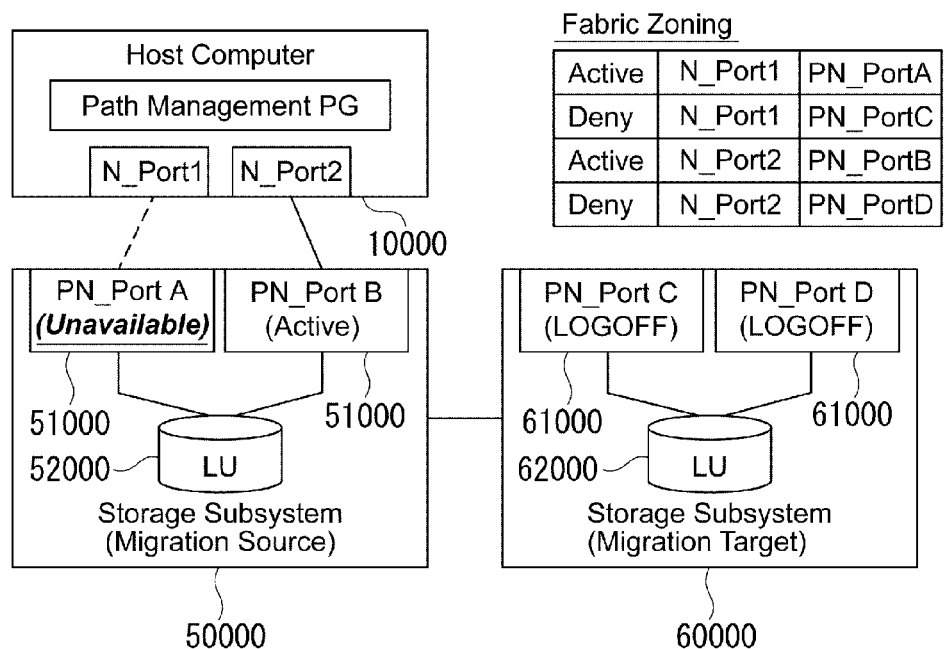
FIG. 16B is a diagram showing the outline of the second data migration method of the storage subsystem according to the second embodiment.
Figure 16C:
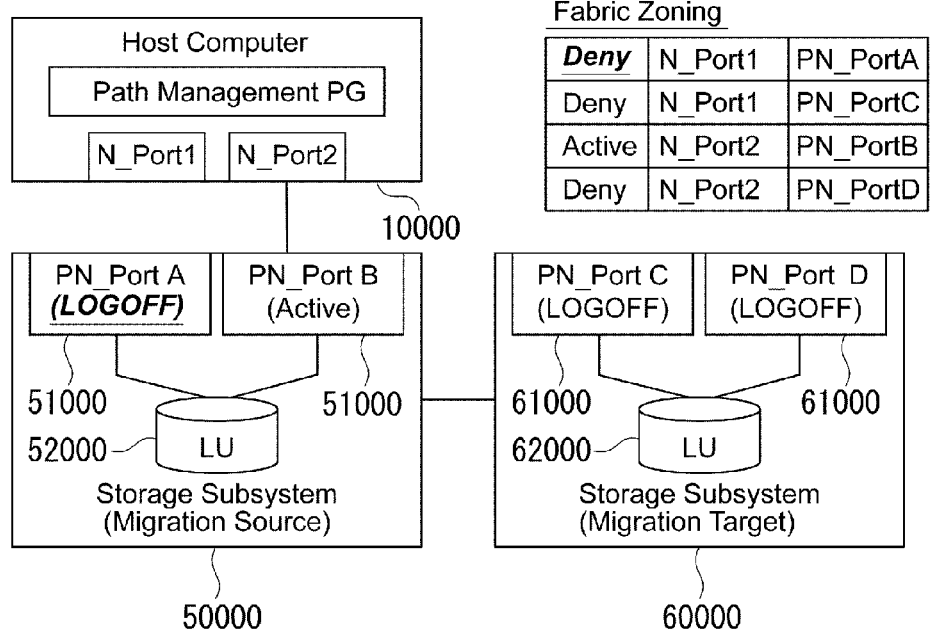
FIG. 16C is a diagram showing the outline of the second data migration method of the storage subsystem according to the second embodiment.
Figure 16D:
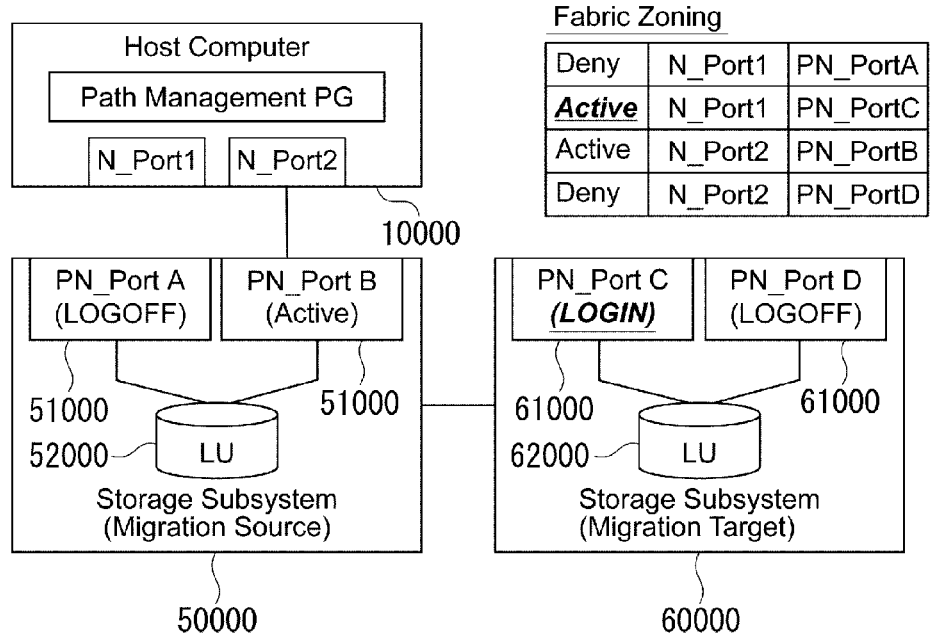
FIG. 16D is a diagram showing the outline of the second data migration method of the storage subsystem according to the second embodiment.
Figure 16E:
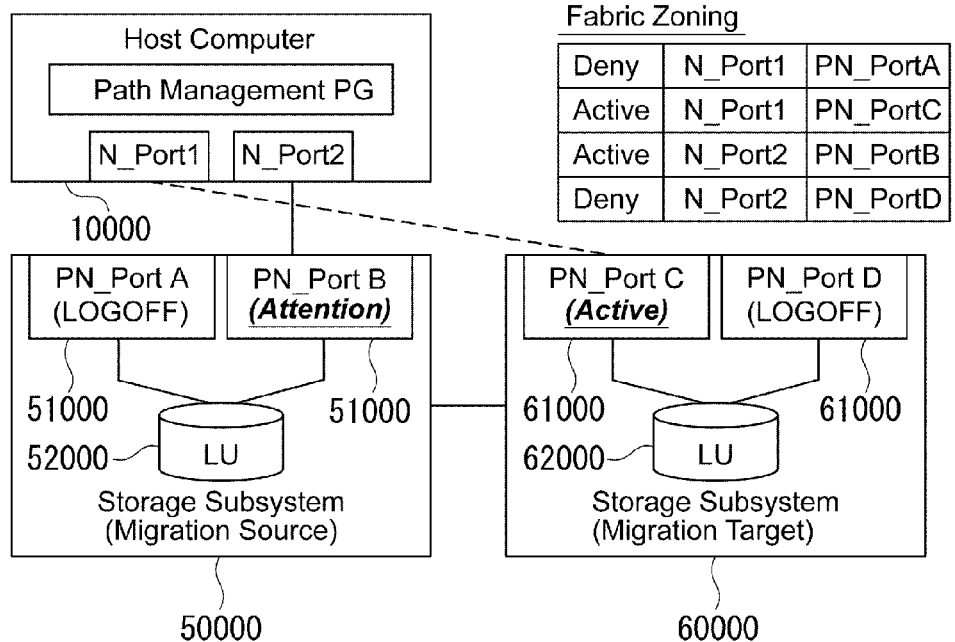
FIG. 16E is a diagram showing the outline of the second data migration method of the storage subsystem according to the second embodiment.
Figure 16F:
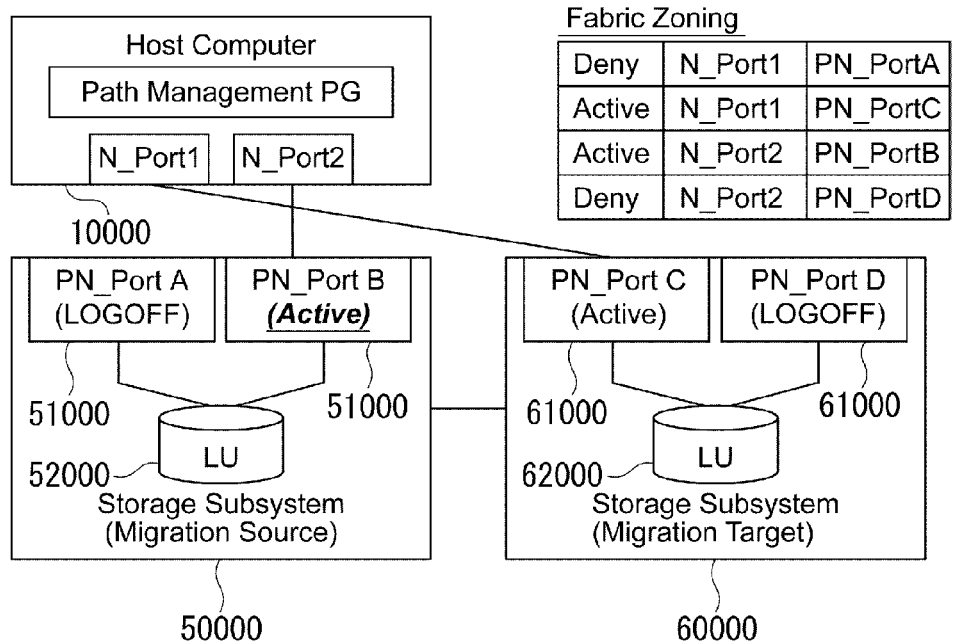
FIG. 16F is a diagram showing the outline of the second data migration method of the storage subsystem according to the second embodiment.

Each of FIG. 15A to 15B shows the state transition of specific ports when the LU migration control program 27300 is applied to a case of migration of two ports in an Active state.

Firstly, how the drawings are illustrated will be explained. In steps from States (1) to (12), the transition by which port names Port A, Port B that are source ports of the source storage subsystem whose name is ST0 are migrated to port names Port C, Port D which are target ports of the target storage subsystem whose name is ST1 will be explained. Regarding each port, its port name, virtual port ID, ALUA status, and Fabric status are indicated in the order listed here from a top line to a bottom line in the relevant frame in the drawings.

States (1) to (6) in FIG. 15A respectively show port migration from the source port Port A to the target port Port C. State (1) shows the initial state of Phase 1. State (2) shows that as a result of Phase 2, the ALUA status of the source port Port A becomes Unavailable and the ALUA status of only the source port Port B is Active. The host computer 10000 can make I/O access via the source port Port B.

State (3) shows that as a result of Phase 3, the source port Port A is logged off from the Fabric and the virtual port ID VN_Port A has been migrated. The host computer 10000 can make I/O access via the source port Port B. State (4) shows that as a result of Phase 4, the target port Port C is logged in the Fabric. The host computer 10000 can make I/O access via the source port Port B.

State (5) shows that the ALUA status of the target port Port C has become Active and the UNIT ATTENTION has been issued from the source port Port B. The host computer 10000 can make I/O access via the source port Port B. State (6) shows that the ALUA status of the source port Port B has returned to Active. Under this circumstance, the host computer 10000 can make I/O access via the source port Port B and the target port Port C. As described above, the target port Port C can take over the virtual port ID VN_Port A from the source port Port A while the host computer 10000 continues making I/O access via the source port Port B.

State (7) to (12) in FIG. 15B shows port migration from the source port Port B to the target port Port D. Although any detailed explanation has been omitted, State (7) to (12) show that the target port Port D can take over the virtual port ID VN_Port B from the source port Port B while the host computer 10000 continues making I/O access via the source port Port C, by repeating the same procedures as in States (1) to (6).

(1-5) Advantageous Effects of First Embodiment

Since the data migration method according to the first embodiment as described above does not require any change of zone settings of a Fibre Channel switch, it is a data migration method performed without changing the virtual port ID of the ports using the aforementioned NPIV. Therefore, in the first embodiment, a takeover of the virtual port ID of the port using the NPIV is performed while controlling the ALUA status of the ports relating to the Multipath I/O function.

Therefore, according to the first embodiment, any change of the zone setting with respect to the host computer 10000 and the Fibre Channel switch is not required because of the takeover of the virtual port ID using the aforementioned NPIV and data migration from the source storage subsystem 50000 to the target storage subsystem 60000 can be performed without stopping I/O access from the host computer 10000 to the logical unit of the storage subsystem.

(2) Data Migration System for Computer System in Second Embodiment

In the second embodiment, data migration is performed without stopping I/O access from the host computer 10000 to the storage subsystem 50000, 60000 by changing the zone setting from the storage subsystem to the data network 30000.

In the aforementioned first embodiment, it is unnecessary to change the zone setting of the Fibre Channel switch, so that it is the method for migrating data without changing the virtual port ID of the port using the NPIV. Accordingly, in the first embodiment, the takeover of the virtual port ID of the port using the NPIV is performed while controlling the ALUA status of the ports relating to the Multipath I/O function.

On the other hand, the second embodiment discloses a method of not using the virtual port ID of the port using the NPIV. Specifically speaking, as a substitute means of the virtual port ID, the second embodiment discloses a method of using for example, Peers Zoning which is being developed as a Fibre Channel standard for ANSI T11. By the method using the Peers Zoning, the zone setting to the Fabric can be changed from the port of the source or target storage subsystem 50000, 60000.

Therefore, the second embodiment is a method for changing an access path from the host computer 10000 to a migration target logical unit by dynamically changing a zone setting from a host port (for example, N_Port1) of the host computer 10000 to the source port (for example, PN_Port A) of the source storage subsystem 50000 and a zone setting from the host port N_Port1 to the target port PN_Port C, while controlling the ALUA status of the ports relating to the Multipath I/O function.

(2-1) System Outline

The outline of the data migration method according to the second embodiment will be explained below.

FIG. 16A to 16F respectively show the outline of the data migration method according to the second embodiment. On an aside, the second embodiment contains the same content as how the relevant drawings are illustrated and the data migration system as explained in the first embodiment (for example, FIG. 1A to 1F), an explanation about the same content has been omitted and mainly the differences between the embodiments will be explained.

In this data migration system, six state transitions, Phase 1 (migration start state (Initial State)) to Phase 6 (migration completed state (Final State)) are performed. The difference with the first embodiment about how the drawings in each phase are illustrated is that the port name of physical ports is indicated for the host computer 10000 and the ports 51000, 61000 of the storage subsystems 50000, 60000. Furthermore, the status of the zone setting is indicated in each phase as follows.

The zone setting herein used means each entry of a table indicated as Fabric zoning and located on the upper right side of the relevant drawing (corresponding to the Fabric zone table described later). A field on the left side of this table indicates whether the relevant zone setting is valid (Active) or invalid (Deny). A center field indicates a port name of the host computer 10000 for the relevant zone setting. A field on the right side indicates a port name of the storage subsystem which is a zone setting target. In the following explanation, the port name itself is used as necessary, instead of the reference numeral, as an identifier representing a port of the storage subsystem.

Firstly, in Phase 1, a zone for the host port N_Port 1 of the host computer 10000 and the source port PN_Port A of the source storage subsystem 50000 is valid, however a zone for the host port N_Port 1 of the host computer 10000 and the target port PN_Port C of the target storage subsystem 60000 is invalid. The state transition between the respective phases will be explained.

Firstly, in Phase 1, the host computer 10000 forms two access paths to/from the logical unit 52000 of the source storage subsystem 50000 via the source port PN_Port A and the source port PN_Port B. The ALUA statuses of both the access paths are Active and the host computer 10000 can issue I/O to both the access paths.

Next, in Phase 2, the source storage subsystem 60000 has the ALUA status of the source port PN_Port A make the transition to a state incapable of using I/O access (Unavailable). As a result of this state transition, the host computer 10000 has the access path from the host port N_Port1 to the logical unit of the source port PN_Port A (the Fabric zone setting is valid), however cannot issue I/O. As a result, the host computer 10000 can make I/O access to the logical unit from the host port N_Port2 via the source port PN_Port B.

Next, in Phase 3, the source port PN_Port A is logged off from the Fabric. Then, the source storage subsystem 50000 issues a Peers Zoning command to the Fabric and sets the zone setting from the host port N_Port 1 to the source port PN_Port A to Deny.

Subsequently, in Phase 4, the target storage subsystem 60000 makes the target port PN_Port C logged in the Fabric. Then, the target storage subsystem 60000 issues the Peers Zoning command to the Fabric and sets the zone setting from the host port N_Port1 to the target port PN_Port C to Active.

Next, in Phase 5, the target storage subsystem 60000 sets the ALUA status of the target port PN_Port C to Active and makes the transition to a state where an access path from the host computer 10000 to the logical unit 61000 exists. However, if the computer system stays in that state, the host computer 10000 cannot issue I/O to the target port PN_Port C of the target storage subsystem 60000. Therefore, the source storage subsystem 50000 sends notice (Attention) from the source port PN_Port B to the host computer 10000 that the access path to the logical unit has been added.

Then, in Phase 6 as a result of reception of the Attention, the host computer 10000 recognizes the target port PN_Port C of the target storage subsystem 60000 as Active and starts issuing I/O to the target port PN_Port C. As a result of the above, access target migration from the source port PN_Port A to the target port PN_Port C is completed.

Next, the system configuration, the data migration processing, and specific examples of the data migration processing will be explained.

(2-2) System Configuration

Next, a configuration example of a computer system according to the second embodiment will be explained. On an aside, since the same elements as those in the computer system and its data migration method according to the first embodiment exist in the computer system and its data migration method according to the second embodiment, an explanation about the same elements has been omitted and mainly the differences between the embodiments will be explained using FIGS. 17 and 18.

Figure 17:
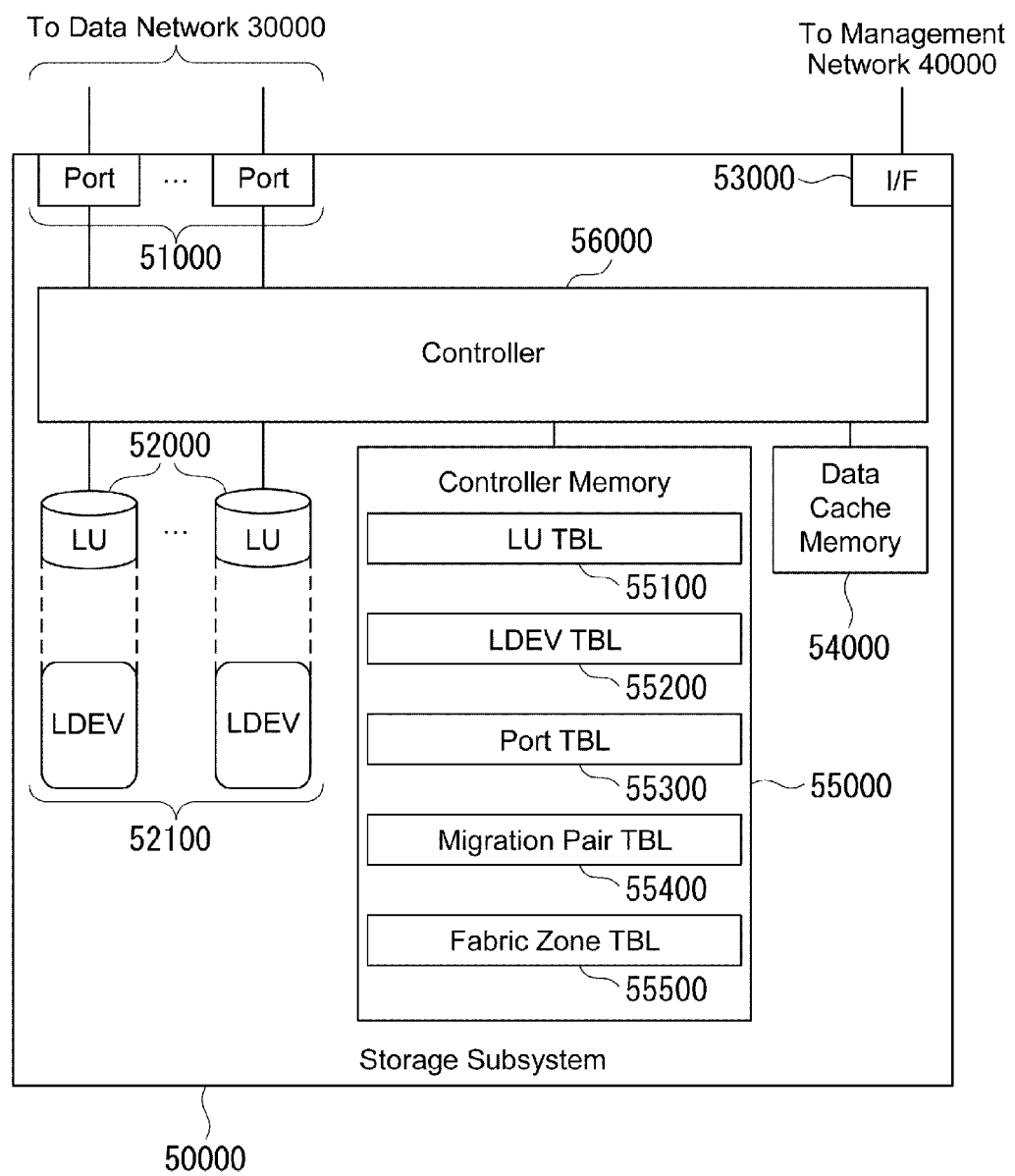
FIG. 17 is a diagram showing the configuration of a storage subsystem according to the second embodiment.

FIG. 17 shows a configuration example of the source storage subsystem 50000 according to the second embodiment. This source storage subsystem 50000 has almost the same configuration as that of the source storage subsystem 50000 according to the first embodiment; however the difference with the source storage subsystem 50000 in the first embodiment is that the source storage subsystem 50000 in the second embodiment has a Fabric zone table 55500 for setting Peers Zoning. The details of this Fabric zone table 55500 will be explained later with reference to 18. On an aside, since the target storage subsystem 60000 according to the second embodiment has almost the same configuration as that of the source storage subsystem 50000, its explanation has been omitted.

FIG. 18 shows a configuration example of the Fabric zone table 55500 in the source storage subsystem 50000 in the second embodiment. The Fabric zone table 55500 includes, as fields, a zone status 55510, a host physical ID 55520 corresponding to a port of the host computer 10000, and a storage physical ID 55530 for identifying a port of the storage subsystem 50000. Since the zone status 55510 has already been explained with reference to FIG. 16 above, its explanation is omitted at this point.

(2-3) Data Migration Processing

Next, data migration processing in the second embodiment will be explained. On an aside, because the content of the second embodiment is almost similar to that of the first embodiment, mainly the differences with the first embodiment will be explained using FIG. 19 and FIG. 20A to 20C.

Figure 19:
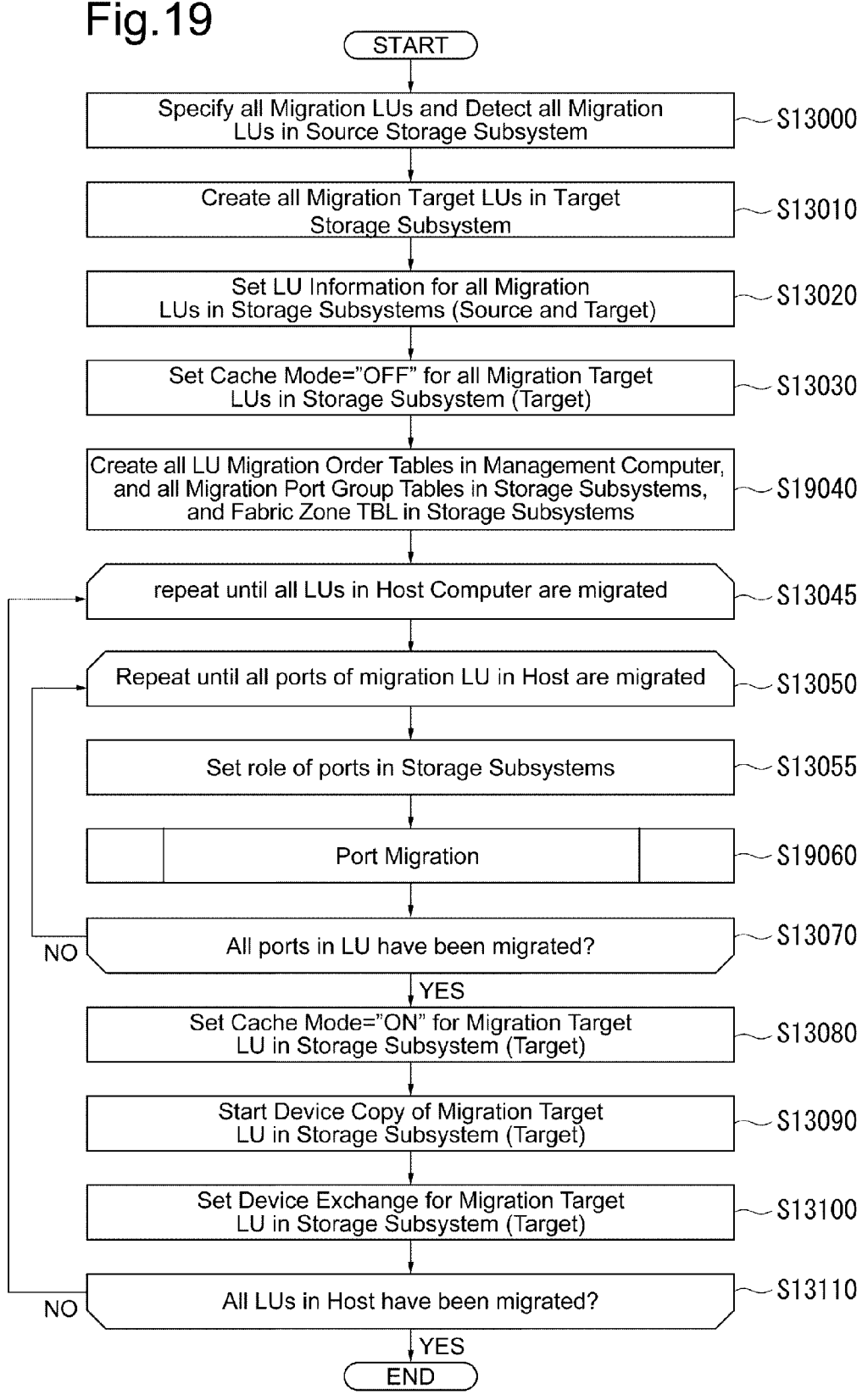
FIG. 19 is a flowchart of an LU migration control program belonging to the management computer according to the second embodiment.

FIG. 19 is a flowchart showing an example of processing executed by the LU migration control program 27300 of the management computer 20000. On an aside, because the flowchart shown in FIG. 19 contains the same processing as explained in the first embodiment with reference to 13, mainly the differences between the embodiments will be explained below.

In the second embodiment, unlike the first embodiment, after the execution of step S13030, the LU migration control program 27300 of the management computer 20000 creates the LU migration order table 27200 in the management computer 20000 and also creates the migration port group table 55400 and the Fabric zone table 55500 in the source and target storage subsystems 50000 and 60000 (S19040).

If a combination of a port of the existing host computer 10000 and a port of the source storage subsystem 50000 is set as a zone and the status of that zone (hereinafter referred to as the zone status) is valid, Active is registered as an entry in the Fabric zone table 55500; and if the zone status is invalid, Deny is registered in the Fabric zone table 55500. Furthermore, if a combination of a port of the host computer 10000 and a port of the target storage subsystem 60000 is set as a zone and the zone status is valid, Active is registered as an entry in the Fabric zone table 55500; and if the zone status is invalid, Deny is registered in the Fabric zone table 55500. Then, the LU migration control program 27300 executes step S13045 and subsequent steps in the same manner as in the first embodiment.

Furthermore, after executing step S13055, the LU migration control program 27300 performs port migration (S19060), the details of which will be explained later with reference to 20A to 20C. Subsequently, the LU migration control program 27300 executes step S13070 and subsequent steps in the same manner as in the first embodiment.

Figure 20C:
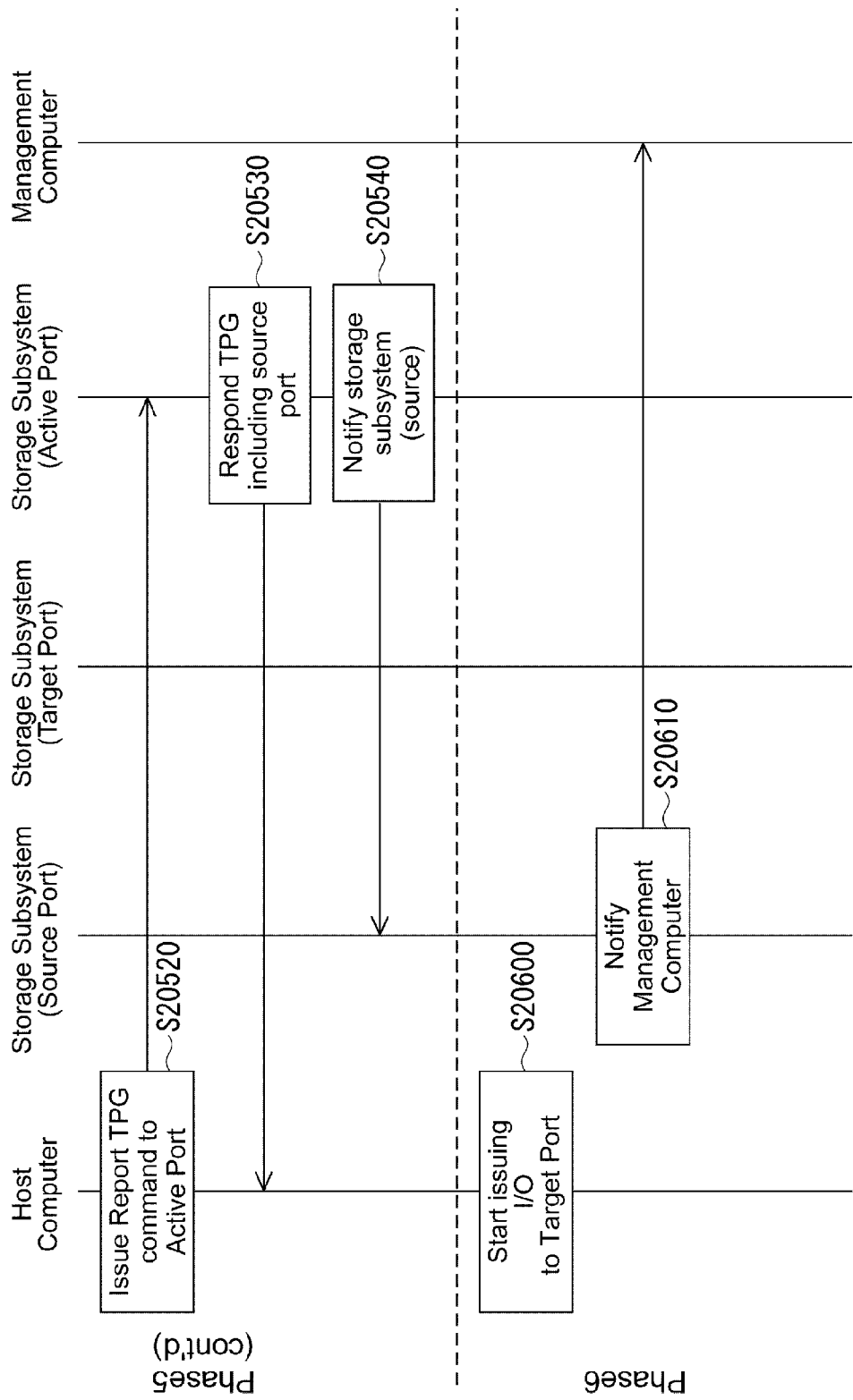
FIG. 20C is a ladder chart of processing executed by the host computer, the management computer, the source storage subsystem, and the target storage subsystem, respectively, during LU migration according to the second embodiment.

FIG. 20A to 20C are ladder charts showing examples of processing executed by the host computer 10000, the management computer 20000, the source storage subsystem 50000, and the target storage subsystem 60000, respectively, for logical unit migration. The ladder charts will be explained below in association with each phase defined in the outline of the data migration system according to the second embodiment as shown in FIG. 16. On an aside, an explanation regarding the same processing as that in the first embodiment as shown in FIG. 13 has been omitted in the explanation for FIG. 20A to 20C.

Firstly, in Phase 1 shown in FIG. 20A, the management computer 20000 issues specific instruction to the source storage subsystem 50000 (S20100).

Next, in Phase 2, the source storage subsystem 50000 which has received the specific instruction changes the ALUA status of the source port to Unavailable (S20200). As a result, the host computer 10000 reissues I/O to another port whose ALUA status is Active as shown in FIG. 20A (S20210). Then, the host computer 10000 which has detected the source port whose ALUA status is Unavailable issues a Report TPG command according to the SCSI standard to another port whose ALUA status is Active (S20220).

Subsequently, the storage subsystem which has received the Report TPG command according to the SCSI standard and has the port whose ALUA status is Active (hereinafter referred to the specific storage subsystem) responds the TPG (S20230). That specific storage subsystem notifies the source storage subsystem 50000 that the next phase should be proceeded (S20240).

Next, in Phase 3, the source storage subsystem 50000 which has received the notice changes the ALUA status of the source port to Offline as shown in FIG. 20B (S20300). After the change to an Offline state is completed, the source storage subsystem 50000 issues a Peers Zoning command to the Fabric and deactivates the zone setting for the host computer 10000 and the source port of the source storage subsystem 50000 (S20310). After the completion of the deactivation, the source storage subsystem 50000 makes the source port log off from the Fabric (S20320).

Then, in Phase 4, the target storage subsystem 60000 makes the target port logged in the Fabric (S20400). After the completion of the login, the target storage subsystem 60000 issues the Peers Zoning command to the Fabric and activates the zone setting for the host computer 10000 and the target port of the target storage subsystem 60000 (S20410).

Next, in Phase 5, the target storage subsystem 60000 changes the ALUA status of the target port to Active (S20500). Then, the target storage subsystem 60000 notifies the source storage subsystem 50000, the target storage subsystem 60000, or both the storage subsystems 50000, 60000, which has/have the port belonging to the TPG, that the ALUA status of the target port has become Active. As a result, when the host computer 10000 issues the next I/O access, any of the storage subsystems having the port which has received the I/O access issues UNIT ATTENTION/ASYMMETRIC ACCESS STATE CHANGED according to the SCSI standard, as notice for updating the TPG, to the host computer 10000 (S20510).

The host computer 10000 which has received the UNIT ATTENTION issues the Report TPG command according to the SCSI standard as shown in FIG. 20C to another port whose ALUA status is Active (S20520). Next, the storage subsystem which has received the Report TPG command according to the SCSI standard (hereinafter referred to as the specific storage subsystem) responds the TPG (S20530). The target port of the target storage subsystem 60000 is included in this TPG. The specific storage subsystem notifies the source storage subsystem 50000 that the next phase should be proceeded (S20540).

Finally, in Phase 6, the host computer 10000 will thereafter issue I/O by including the target port of the target storage subsystem 60000 (S20600). The source storage subsystem 50000 notifies the management computer 20000 that the port migration has been completed (S20610).

(2-4) Concrete Application Examples of Data Migration Processing

Next, concrete application examples of the data migration processing according to the second embodiment will be explained. FIGS. 21A and 21B respectively shows the state transition of specific ports when the LU migration control program 27300 is applied to a case of migration of two ports in an Active state. How FIGS. 21A and 21B are illustrated is almost similar to that of FIGS. 15A and 15B as explained earlier, except that the port ID is the physical port ID and the Fabric zone status is indicated.

In steps from States (1) to (12), the transition by which port names Port A, Port B that are source ports of the source storage subsystem whose name is ST0 are migrated to port names Port C, Port D that are target ports of the target storage subsystem whose name is ST1 will be explained. Regarding each port, its port name, physical port ID, ALUA status, Fabric status, and Fabric zone are indicated in the order listed here from a top line to a bottom line in the relevant frame in the drawings.

States (1) to (6) show port migration from the source port Port A to the target port Port C. State (1) shows the initial state of Phase 1. State (2) shows that as a result of Phase 2, the ALUA status of the source port Port A becomes Unavailable and the ALUA status of only the source port Port B is Active. Under this circumstance, the host computer 10000 can make I/O access via the source port Port B.

State (3) shows that as a result of Phase 3, the source port Port A is logged off from the Fabric and the Fabric zone status of the host port Port1 of the host computer 10000 and the port Port A of the source storage subsystem 50000 has become invalid. Under this circumstance, the host computer 10000 can make I/O access via the source port Port B.

State (4) shows that as a result of Phase 4, the target port Port C is logged in the Fabric and the Fabric zone status of the host port Port1 and the target port Port C of the target storage subsystem 60000 has become valid. Under this circumstance, the host computer 10000 can make I/O access via the source port Port B. State (5) shows that the ALUA status of the target port Port C has become Active and the UNIT ATTENTION has been issued from the source port Port B. Under this circumstance, the host computer 10000 can make I/O access via the source port Port B. State (6) shows that the ALUA status of the source port Port B has returned to Active. The host computer 10000 can make I/O access via the source port Port B and the target port Port C.

State (7) to (12) show port migration from the source port Port B to the target port Port D. Although any detained explanation has been omitted, State (7) to (12) show that the Fabric zone status is switched from the source port Port B to the target port Port D while the host computer 10000 continues making I/O access via the source port Port C, by repeating the same procedures as in States (1) to (6).

According to the second embodiment, because of the method of using the Peers Zoning, it is unnecessary to change the settings of the host computer 10000 even if the storage subsystems 50000, 60000 that do not support the NPIV are used; and it is possible to migrate data between the storage subsystems 50000, 60000 without stopping I/O access from the host computer 10000 to the logical units of the storage subsystems 50000, 60000.

(3) Data Migration System for Computer System in Third Embodiment

The third embodiment corresponds to a variation of the data migration system according to the second embodiment and adopts a data migration system for preventing a decrease of the number of Active access paths for a target logical unit during migration.

The second embodiment above shows that because of the method of using the Peers Zoning, it is unnecessary to change the settings of the host computer 10000 even if the storage subsystems 50000, 60000 that do not support the NPIV are used; and it is possible to migrate data between the storage subsystems 50000, 60000 without stopping I/O access from the host computer 10000 to the logical units of the storage subsystems 50000, 60000. However, a state where the number of access paths in an Active state becomes one during the data migration processing occurs in the aforementioned first and second embodiments. This is because the number of access paths in an Active state decreases during switching of the virtual port ID or switching of the zone by the Peers Zoning command.

Therefore, the third embodiment provides a method capable of data migration while maintaining availability without decreasing the number of Active I/O access paths for the source storage subsystem 50000 and the target storage subsystem 6000.

(3-1) System Outline

FIG. 22A to 22F respectively show the outline of a data migration method by a computer system according to the third embodiment. Regarding the third embodiment, an explanation about the same elements as how the drawings are illustrated and the data migration system according to the second embodiment as explained with reference to 16 has been omitted and mainly the differences between the embodiments will be explained.

Figure 22A:
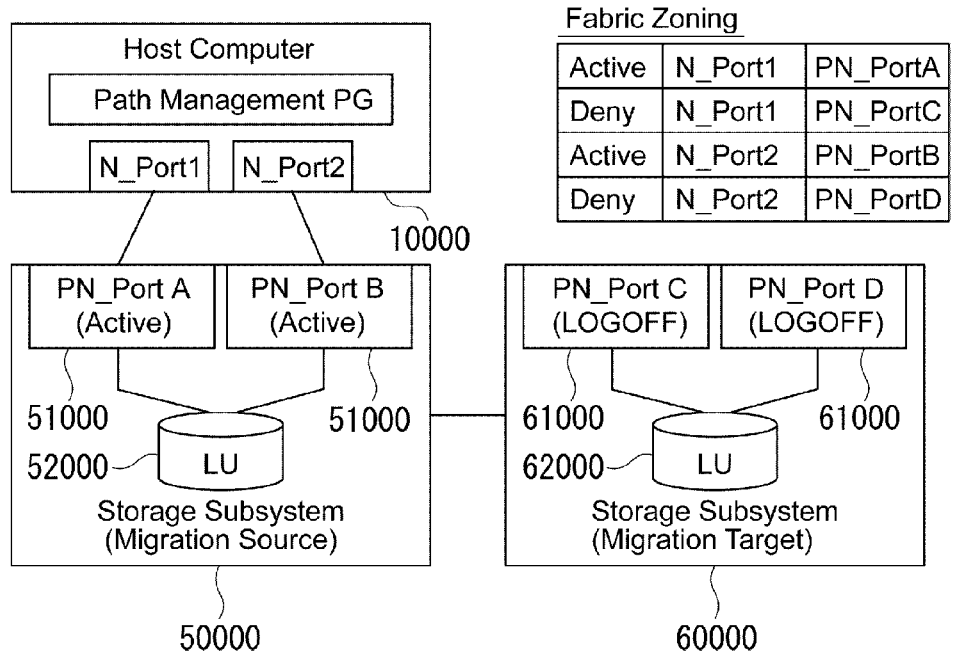
FIG. 22A is a diagram showing the outline of a third data migration method of a storage subsystem according to a third embodiment.

Since Phase 1 shown in FIG. 22A is similar to Phase 1 in the aforementioned second embodiment, its explanation is omitted here.

Figure 22B:
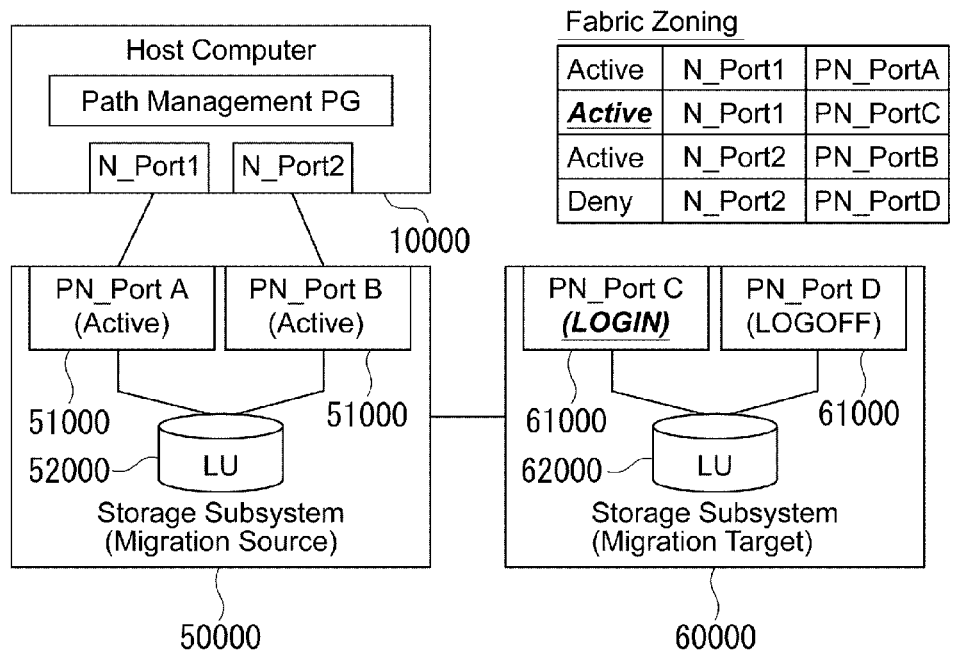
FIG. 22B is a diagram showing the outline of the third data migration method of the storage subsystem according to the third embodiment.

In Phase 2 shown in FIG. 22B, the target storage subsystem 60000 makes the target port logged in the Fabric. After the completion of the login, the target storage subsystem 60000 issues the Peers Zoning command to the Fabric and changes the zone setting from the host port N_Port1 to the target port PN_Port C to Active.

Figure 22C:
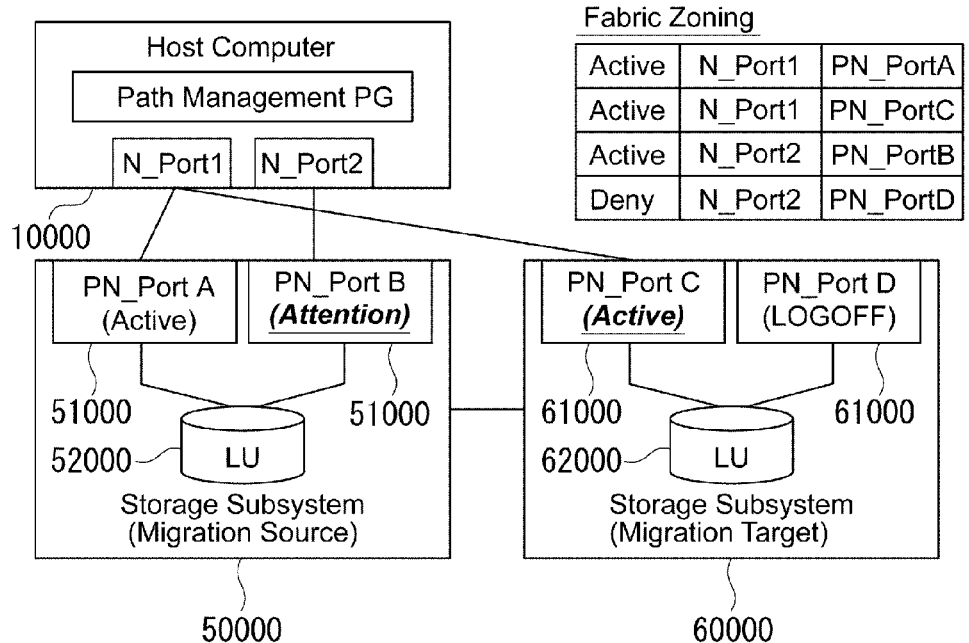
FIG. 22C is a diagram showing the outline of the third data migration method of the storage subsystem according to the third embodiment.

In Phase 3 shown in FIG. 22C, the target storage subsystem 60000 has the ALUA status of the source port PN_Port C make the transition to an Active state, which results in a state where the access path from the host computer 10000 to the logical unit exists. However, if the computer system stays in that state, the host computer 10000 cannot issue I/O to the target port PN_Port C of the target storage subsystem 60000. Therefore, the source storage subsystem 50000 sends notice (Attention) from the source port PN_Port B to the host computer 10000 that the access path to the logical unit has been added.

Figure 22D:
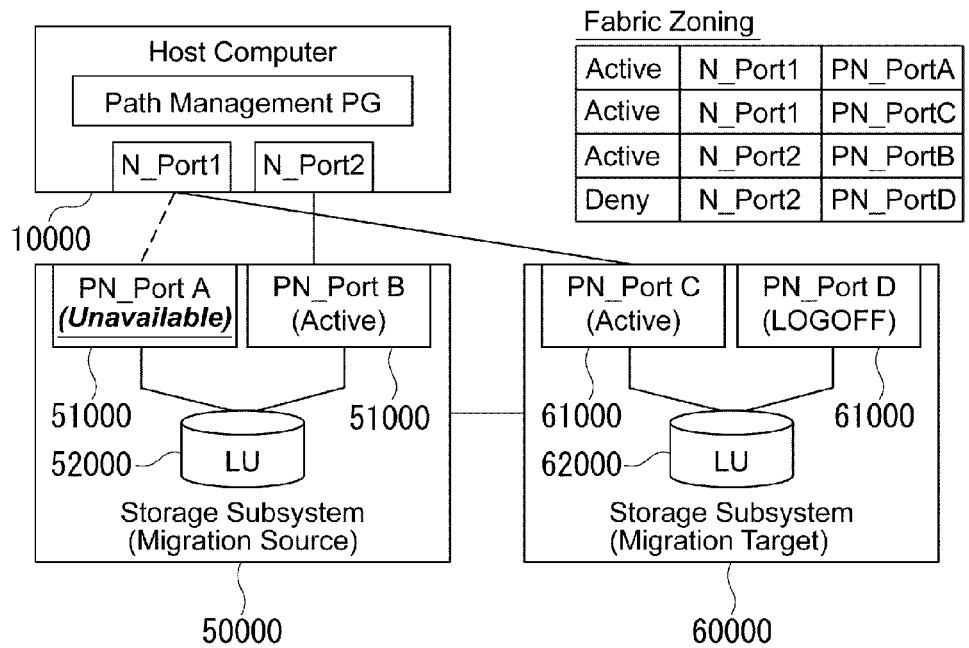
FIG. 22D is a diagram showing the outline of the third data migration method of the storage subsystem according to the third embodiment.

In Phase 4 shown in FIG. 22D, the source storage subsystem 50000 has the ALUA status of the source port PN_Port A make the transition to a state incapable of using I/O access (Unavailable).

Figure 22E:
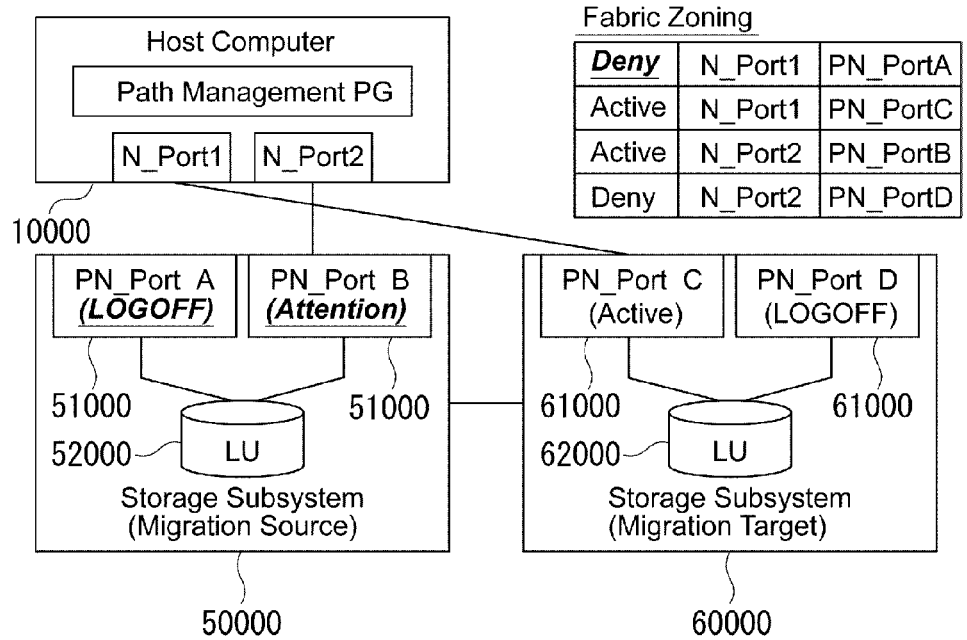
FIG. 22E is a diagram showing the outline of the third data migration method of the storage subsystem according to the third embodiment.

In Phase 5 shown in FIG. 22E, the source port PN_Port A is logged off from the Fabric. After the completion of the logoff, the source storage subsystem 50000 issues the Peers Zoning command to the Fabric and sets the zone setting from the host port N_Port1 to the source port PN_Port A to Deny. Furthermore, the source storage subsystem 50000 sends notice (Attention) from the source port PN_Port B to the host computer 10000 that the access path to the logical unit has been added.

Figure 22F:
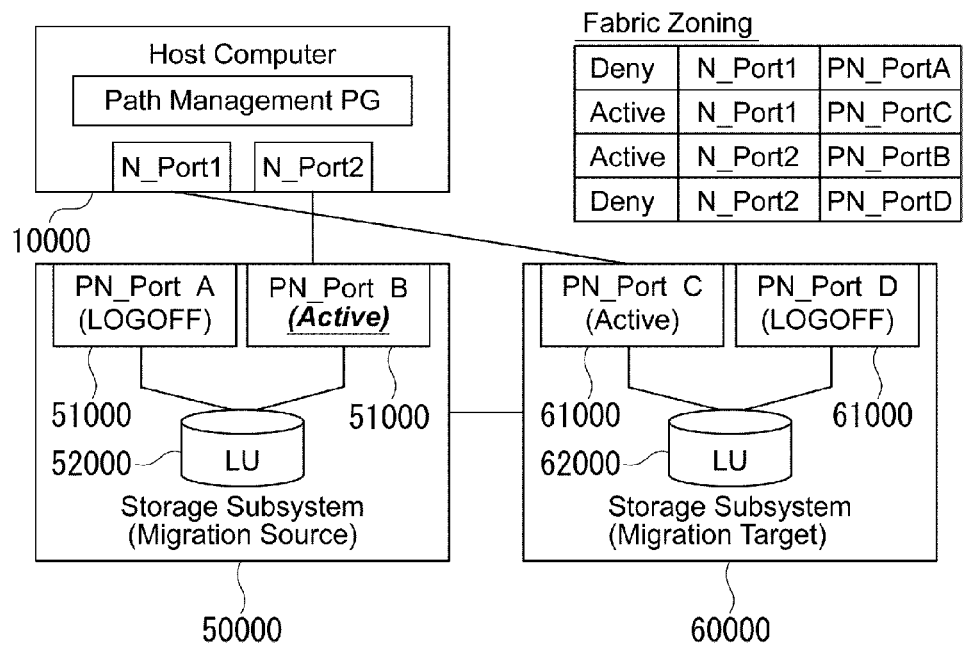
FIG. 22F is a diagram showing the outline of the third data migration method of the storage subsystem according to the third embodiment.

In Phase 6 shown in FIG. 22F as a result of reception of the Attention, the number of access paths from the host computer 10000 to the migration target logical unit becomes two.

Next, the system configuration, the data migration processing, and specific examples of the data migration processing according to the third embodiment will be explained.

(3-2) System Configuration

Since the configuration of the computer system according to the third embodiment is similar to that of the computer system according to the second embodiment, its explanation has been omitted.

(3-3) Data Migration Processing

Figure 23A:
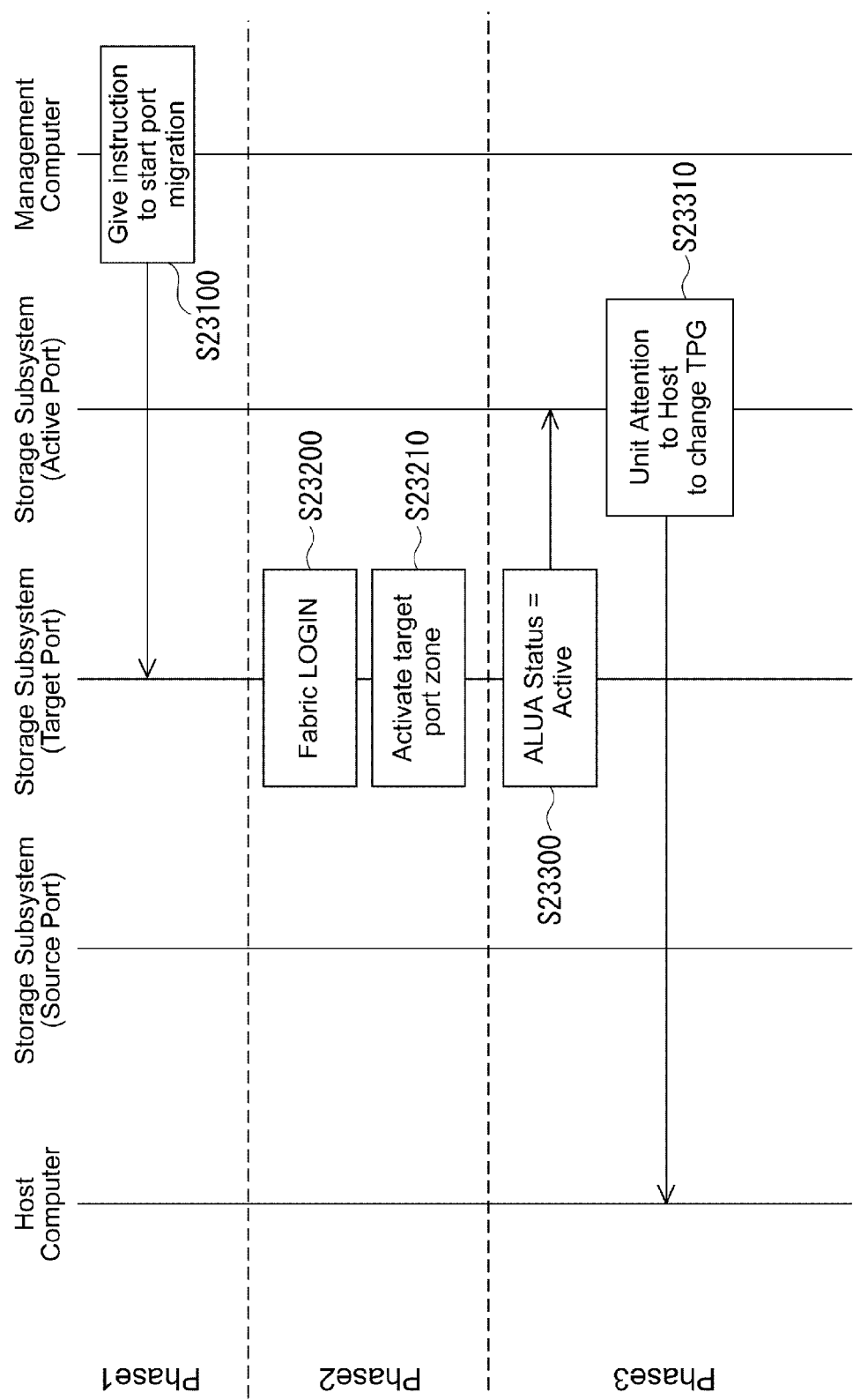
FIG. 23A is a ladder chart of processing executed by the host computer, the management computer, the source storage subsystem, and the target storage subsystem, respectively, during LU migration according to the third embodiment.
Figure 23B:
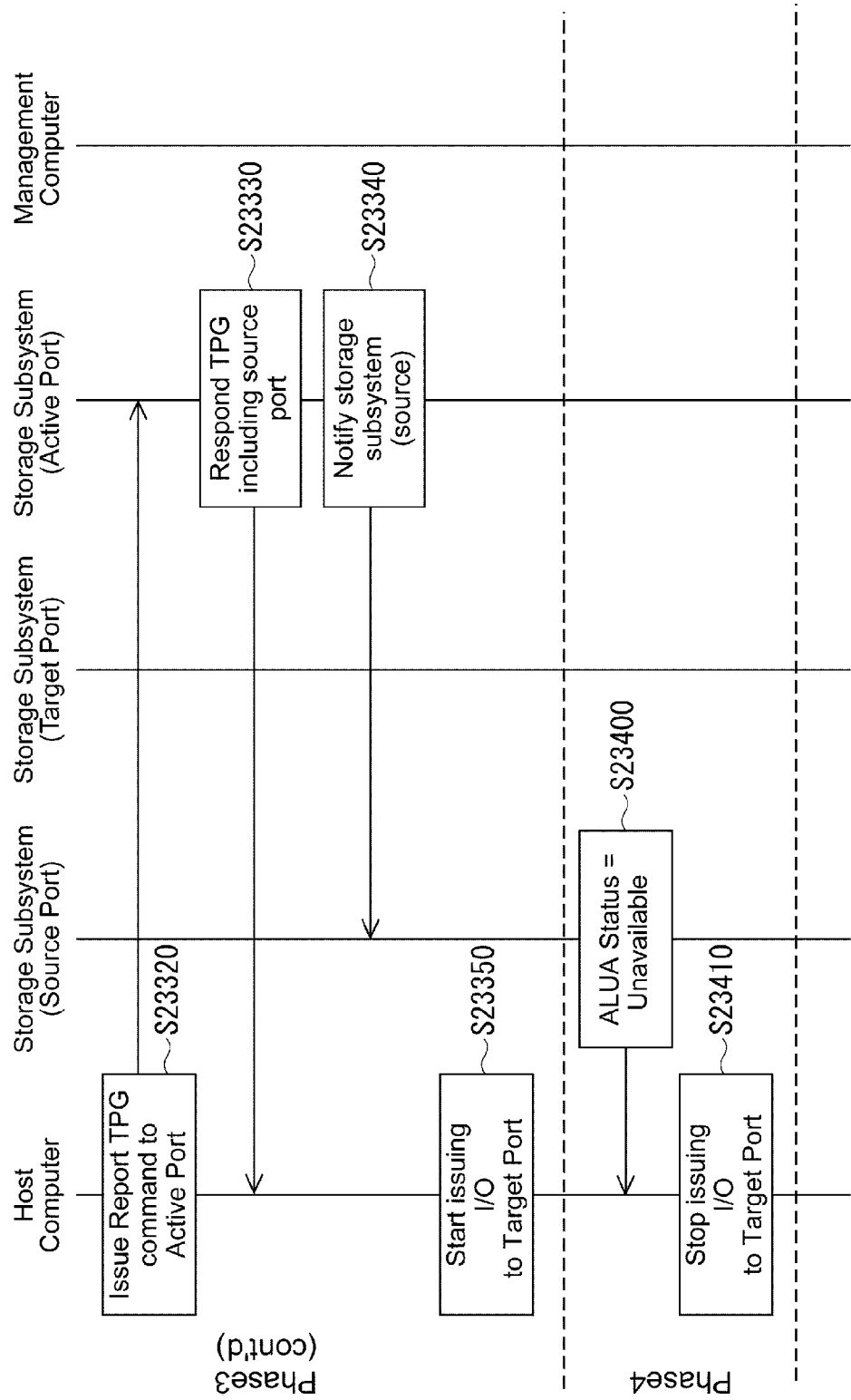
FIG. 23B is a ladder chart of processing executed by the host computer, the management computer, the source storage subsystem, and the target storage subsystem, respectively, during LU migration according to the third embodiment.

Next, an example of the data migration processing according to the third embodiment will be explained. Each of FIG. 23A to 23C is a ladder chart showing an example of processing executed by the host computer 10000, the management computer 20000, the source storage subsystem 50000 and the target storage subsystem 60000, respectively. The ladder charts will be explained below in the same manner as how the relevant drawings are illustrated for the aforementioned ladder charts in association with each phase defined in the outline of the data migration system according to the second embodiment (see FIG. 20). On an aside, an explanation regarding the same processing as that in the first embodiment as shown in FIG. 14A to 14C in the first embodiment or FIG. 20A to 20C in the second embodiment has been omitted in the explanation for FIG. 23A to 23C.

Firstly, in Phase 1 shown in FIG. 23A, the management computer 20000 issues port migration instruction to the target storage subsystem 50000 equipped with the target port (S23100).

Next, in Phase 2, the target storage subsystem 60000 which has received the instruction makes the target port logged into the Fabric (S23200). After the completion of the login, the target storage subsystem 60000 issues the Peers Zoning command to the Fabric and activates the zone setting for the host computer 10000 and the target port (S23210).

Subsequently, in Phase 3, the target storage subsystem 60000 changes the ALUA status of the target port to Active (S23300). Then, the target storage subsystem 60000 notifies the source storage subsystem 50000, the target storage subsystem 60000, or both the storage subsystems 50000, 60000, which has/have the port belonging to the TPG, that the ALUA status of the target port has become Active. As a result, when the host computer 10000 issues the next I/O access, the storage subsystem having the port which has received the I/O access issues UNIT ATTENTION/ASYMMETRIC ACCESS STATE CHANGED (hereinafter simply referred to as the UNIT ATTENTION) according to the SCSI standard, as notice for updating the TPG, to the host computer 10000 (S23310).

The host computer 10000 which has received the UNIT ATTENTION issues the Report TPG command according to the SCSI standard as shown in FIG. 23B to another port whose ALUA status is Active (S23320). Next, the storage subsystem which has received the Report TPG command according to the SCSI standard (hereinafter referred to as the specific storage subsystem) responds the TPG (S23330). When this happens, the target port of the target storage subsystem 60000 is included in the TPG. Then, the source storage subsystem 50000 is notified that that the next phase should be proceeded (S23340). The host computer 10000 will thereafter issue I/O by including the target port of the target storage subsystem 60000 (S23350).

Next, in Phase 4, the source storage subsystem 50000 changes the ALUA status of the source port to Unavailable (S23400). As a result, the host computer 10000 reissues I/O to another port whose ALUA status is Active (S23410).

Next, in Phase 5 shown in FIG. 23C, the host computer 10000 issues the Report TPG command according to, for example, the SCSI standard to another port whose ALUA status is Active (S23500). Then, the storage subsystem which has received the Report TPG command according to the SCSI standard and has the port whose ALUA status is Active (hereinafter referred to as the specific storage subsystem) responds the TPG (S23510). The specific storage subsystem notifies the source storage subsystem 50000 that the next phase should be proceeded (S23520).

The source storage subsystem 50000 which has received the notice changes the ALUA status of the source port to offline (S23530). Then, the source storage subsystem 50000 issues the Peers Zoning command to the Fabric and deactivates the zone setting for the host computer 10000 and the source port (S23540). After the completion of deactivation, the source storage subsystem 50000 makes the source port log off from the Fabric (S23550).

Finally, in Phase 6, the target storage subsystem 60000 notifies the management computer 20000 that the port migration has been completed (S23600).

(3-4) Specific Application Examples of Data Migration Processing

Figure 24:
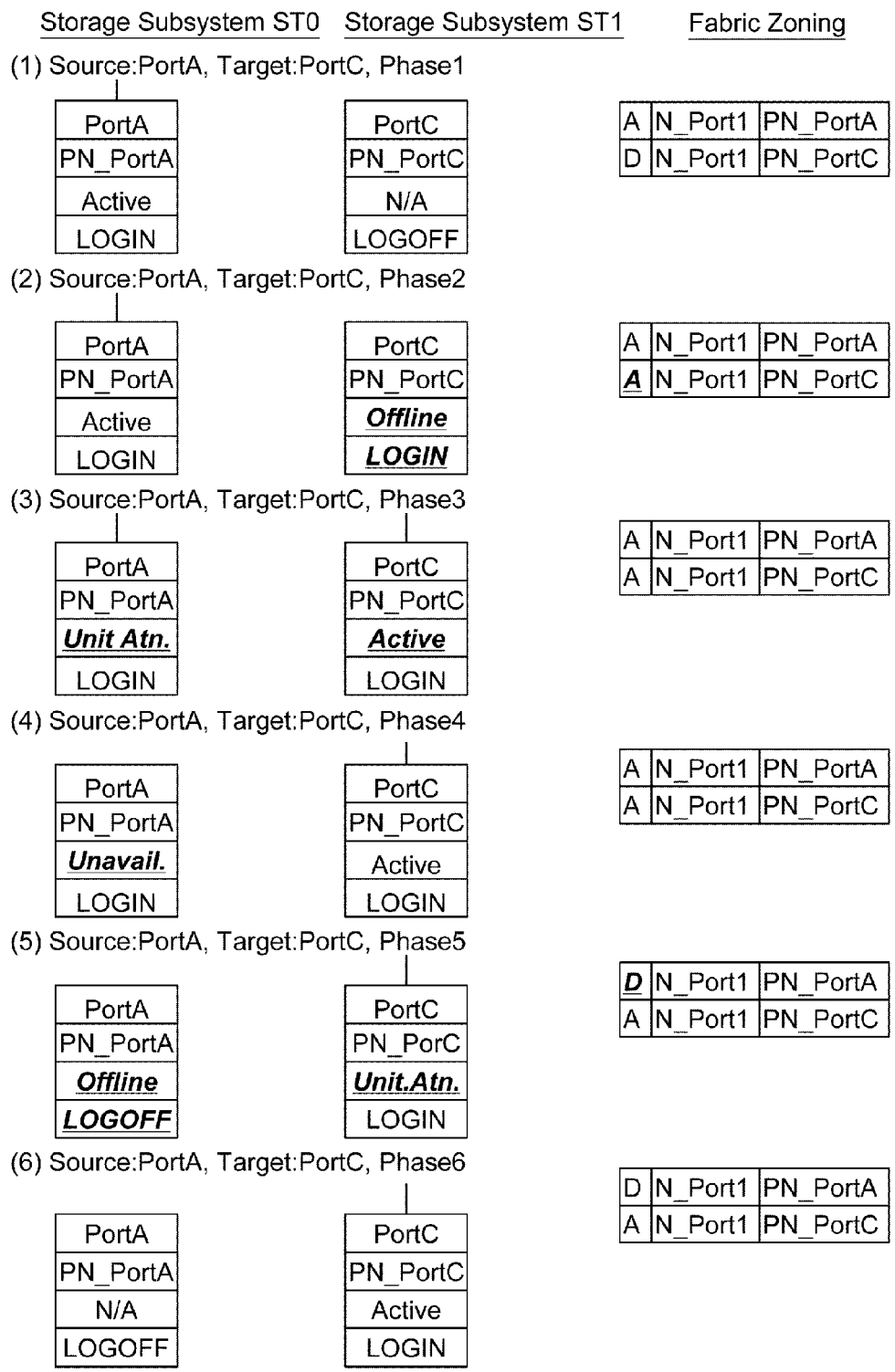
FIG. 24 is a diagram concretely showing a port status transition according to the third embodiment.

Finally, a specific application example of the data migration processing according to the third embodiment will be explained. FIG. 24 shows the state transition of a specific port when the LU migration control program 27300 is applied to a case of migration of one port in an Active state. On an aside, how FIG. 24 is illustrated is similar to the second embodiment above, its explanation has been omitted.

States (1) to (6) show the transition by which a port name Port A that is a source port of the source storage subsystem whose name is ST0 is migrated to a port name Port C which is a target port of the target storage subsystem whose name is ST1. The frame in the drawing at each port shown shows its port name, physical port ID, ALUA status, Fabric status and Fabric zone status from the top to the bottom.

States (1) to (6) show port migration from the source port Port A to the target port Port C. State (1) shows the initial state of Phase 1. State (2) shows that as a result of Phase 2, the target port Port C is logged in the Fabric and the Fabric zone status of the host port N_Port 1 of the host computer 10000 and the target port Port C of the target storage subsystem 60000 has become valid. Under this circumstance, the host computer 10000 can make I/O access via the source port Port A.

State (3) shows that as a result of Phase 3, the ALUA status of the target port Port C has become Active and the UNIT ATTENTION has been issued from the source port Port B. The host computer 10000 can make I/O access via the source port Port B and the target port Port C. State (4) shows that as a result of Phase 4, the ALUA status of the source port Port A has become Unavailable and the ALUA status of only the target port Port C is Active. The host computer 10000 can make I/O access via the target port Port C.

State (5) shows that as a result of Phase 5, the source port Port A is logged off from the Fabric and the Fabric zone status of the host port N_Port1 and the source port Port A of the source storage subsystem 50000 has become invalid. The host computer 10000 can make I/O access via the target port Port C. State (6) shows that the ALUA status of the source port Port B has returned to Active. Under this circumstance, the host computer 10000 can make I/O access via the target port Port C.

According to the third embodiment as described above, data can be migrated while maintaining availability without decreasing the number of Active access paths for the source storage subsystem 50000 and the target storage subsystem 60000. Furthermore, data migration can be performed even with a system configuration where only one access path can be prepared for each of the source and target storage subsystems 50000 and 60000.

(4) Configuration Example of Another Computer System Data Migration System in First, Second or Third Embodiment can be Applied The first, second or third embodiment discloses the system configuration in which each of the host computer 10000, the management computer 20000 and the storage subsystems 50000 and 60000 can be individually added to or removed from the computer system.

Figure 25:
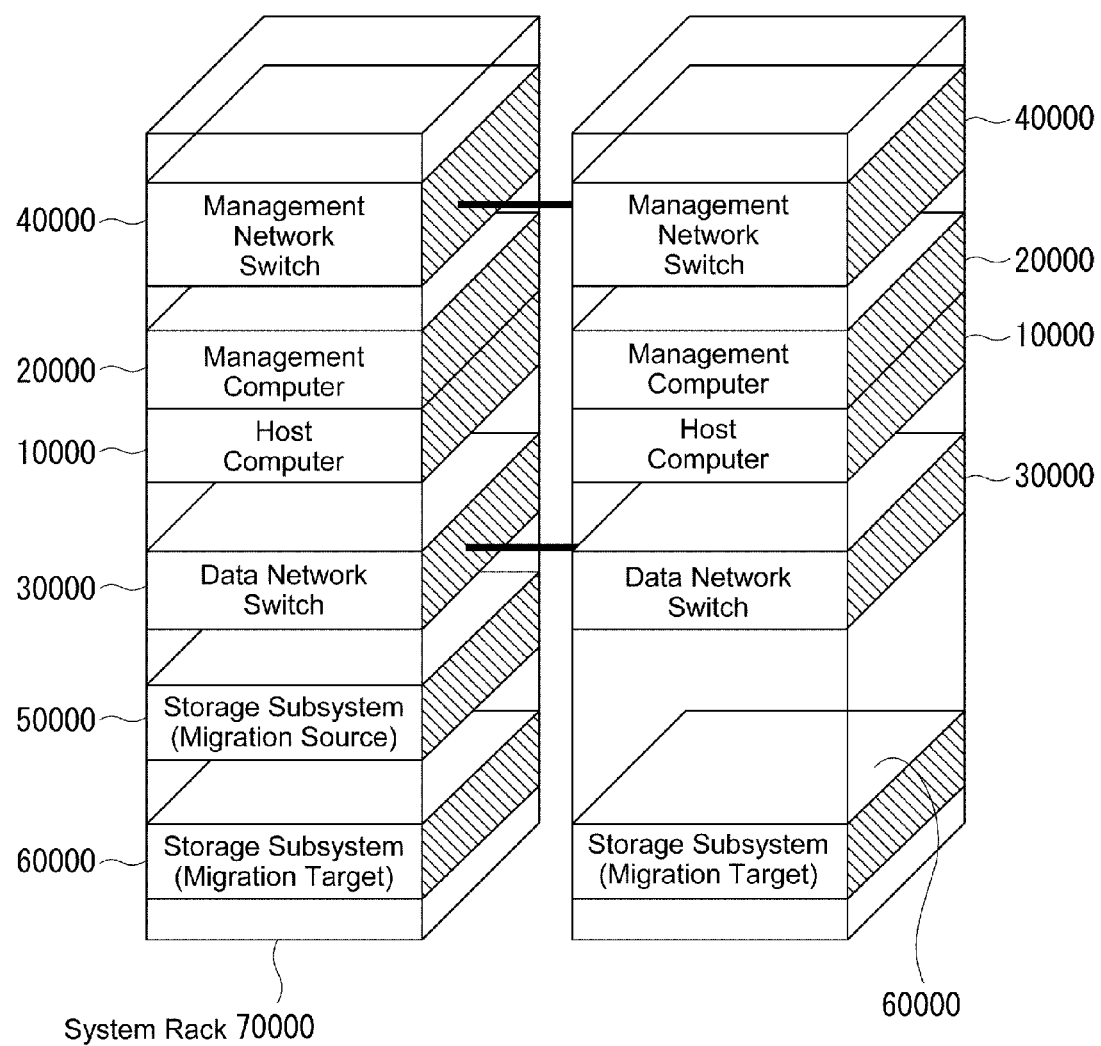
FIG. 25 is a diagram explaining another system configuration to which a data migration system according to the first, second or third embodiment can be applied.

FIG. 25 shows a configuration example of another computer system to which the data migration according to the first, second or third embodiment can be applied. Referring to 25, the host computer 10000, the management computer 20000, the data network switch 30000, the management network switch 40000, and the storage subsystem 50000 are mounted in a system rack 70000. Although it is not shown in the drawing, these devices are mutually connected via a data network and a management network in the system rack 70000. Furthermore, when configuring the system, the user adds or removes the devices in a system rack unit. When this happens, devices in different system racks can be connected to each other by mutually coupling the data network switches and the management network switches.

Even with such a configuration, the first, second or third embodiment can be applied to data migration between the storage subsystems mounted in the same system rack 70000, for example, data migration associated with addition of a storage subsystem, data migration associated with removal of a storage subsystem, or data migration for distributing the load on the storage subsystems. Alternatively, the first, second or third embodiment can also be applied to data migration between storage subsystems mounted in different system racks. For example, when a system rack 70000 is added, the first, second or third embodiment can also be applied to migrate data from a storage subsystem in the existing system rack to a storage subsystem in the added system rack. Furthermore, when removing a certain system rack, the first, second or third embodiment can also be applied to migrate data from a storage subsystem in the system rack to be removed to a storage subsystem in the existing system rack. Also, the first, second or third embodiment can also be applied to data migration for distributing the load on storage subsystems between a plurality of system racks.

(5) Other Embodiments

The above-described embodiments are examples given for the purpose of describing this invention, and it is not intended to limit the invention only to these embodiments. Accordingly, this invention can be utilized in various ways unless the utilizations depart from the gist of the invention. For example, processing sequences of various programs have been explained sequentially in the embodiments described above; however, the order of the processing sequences is not particularly limited to that described above. Therefore, unless any conflicting processing result is obtained, the order of processing may be rearranged or concurrent operations may be performed.

INDUSTRIAL APPLICABILITY

The present invention can be applied particularly to data migration when replacing one storage subsystem with another storage subsystem in a computer system.

REFERENCE SIGNS LIST

11000 Port
17200 Path management program
20000 Management computer
27200 LU migration order table
27300 LU migration control program
30000 Data network
40000 Management network
50000, 60000 Storage subsystems
51000, 61000 Port
52000, 62000 Logical units
55100, 65100 LU tables
55200, 65200 LDEV tables
55300, 65300 Port tables
55400, 65400 Migration port group tables
56000, 66000 Controllers

The invention claimed is:

1. A computer system comprising:
 a source storage subsystem including a plurality of source ports and a migration source logical unit configured to store data;
 a target storage subsystem including a plurality of target ports and a migration target logical unit configured to store the data migrated from the migration source logical unit via a data line coupling the source storage subsystem and the target storage subsystem;
 a host computer including a plurality of host ports, wherein a plurality of access paths for transmitting and receiving data to and from the migration source logical unit are formed via the plurality of host ports and the plurality of source ports;
 a management computer including a path migration control unit; and
 a fabric connection device including a fiber channel switch for mutually coupling the plurality of host ports of the host computer, the plurality of source ports of the source storage subsystem, and the plurality of target ports of the target storage subsystem;
 wherein the path migration control unit is configured to:
 set a status of the first one of the access paths to an unavailable state,
 set a first next access path, which is used instead of the first one of the access paths in an available state between the first one of the host ports and the first one of the target ports,
 set the first next access path to an available state; and
 the path migration control unit is further configured to:
 set a status of the second one of the access paths to an unavailable state,
 set a second next path, which is used instead of the second one of the access paths in an available state, between the second one of the host ports and the second one of the target ports,
 set the second next access path to an available state.

2. The computer system according to claim 1, wherein the source and target storage subsystems respectively include:
 a port management unit configured to manage the plurality of source and target ports and a plurality of virtual identifiers for the plurality of source and target ports; and
 a virtual port identifier exchange unit configured to exchange the virtual identifiers assigned to first one of the source ports with the virtual identifier assigned to the first one of the target ports, and exchange the virtual identifier assigned to the second one of the target ports.

3. The computer system according to claim 1, wherein the path migration control unit is configured to issue an instruction to the source storage subsystem to:
 set a status of first one of the source ports in an available state, to an unavailable state,
 set first one of the source ports logged off from the fabric connection device, and exchange the virtual identifier for the first one of the source ports with the virtual identifier of the one of the target ports,
 wherein the path migration control unit is further configured to issue an instruction to the target storage subsystem to:
 set a new virtual identifier of the first one of the target ports logged in the fabric connection device, and have the status of first one of the target ports make transition to an available state.

4. The computer system according to claim 1, wherein the source and target storage subsystems respectively comprising a zone setting management unit configured to set a zone respectively for a combination of first one of the host ports and first one of the source and target ports via the fabric connection device, and for a combination of second one of the host ports and second one of the source and target ports via the fabric connection device, and manage a zone setting for activating or deactivating the connection status thereof at the each zone.

5. The computer system according to claim 4, wherein the path migration control unit is configured to give an instruction to the source storage subsystem to:
 change a status of first one of the source ports to an unavailable state and an offline state, deactivate the zone setting for the host computer and first one of the source ports, and then set the first one of the source ports logged off from the fabric connection device;
 have the first one of the target ports logged in the fabric connection device and also activate the zone setting for the host computer and the first one of the target ports, and then change a status of first one of the target ports to an available state;
 further have the target storage subsystem notify at least one of the target and source storage subsystems including a port belonging to a migration port group including first one of the target ports; and
 have any of the storage subsystems with an available port respond to the new migration port group, which includes information about first one of the target ports of the target storage subsystem, to the host computer.

6. A data migration method for a computer system including:
 a source storage subsystem including a plurality of source ports and a migration source logical unit configured to store data;
 a target storage subsystem including a plurality of target ports and a migration target logical unit configured to store the data migrated from the migration source logical unit via a data line coupling the source storage subsystem and the target storage subsystem;
 a host computer including a plurality of host ports, wherein a plurality of access paths for transmitting and receiving data to and from the migration source logical unit are formed via the plurality of host ports and the plurality of source ports;
 a management computer including a path migration control unit; and
 a fabric connection device mutually fabric-coupling the plurality of host ports of the host computer, the plurality of source ports of the source storage subsystem, and the plurality of target ports of the target storage subsystem;

the data migration method comprising:

a path migration control step whereby the path migration control unit sets a status of the first one of the access paths to an unavailable state, sets a first next access path, which is used instead of the first one of the access paths in an available state, between the first one of the host ports and the first one of the target ports, sets the first next access path to an available state; and the path migration control unit further sets a status of the second one of the access paths to an unavailable state, sets a second next path, which is used instead of the second one of the access paths in an available state, between the second one of the host ports and the second one of the target ports, sets the second next access path to an available state.

7. The data migration method for the computer system according to claim 6, wherein the source and target storage subsystems respectively manage the plurality of source and target ports and a plurality of virtual identifiers for the plurality of source and target ports; and wherein the path migration control step includes a virtual port identifier exchange step of exchanging the virtual identifiers assigned to first one of the source ports with the virtual identifier assigned to the first one of the target ports, and of exchanging the virtual identifier assigned to the second one of the target ports.

8. The data migration method for the computer system according to claim 6, wherein in the path migration control step, the source storage subsystem sets a status of first one of the source ports in an available state, to an unavailable state, sets first one of the source ports logged off from the fabric connection device, and exchanges the virtual identifier for the first one of the source ports with the virtual identifier of the one of the target ports, wherein further in the path migration control step, the target storage subsystem sets a new virtual identifier of the first one of the target ports logged in the fabric connection device, and has the status of first one of the target ports make transition to an available state.

9. The data migration method for the computer system according to claim 6, wherein the source and target storage subsystems respectively comprise a zone setting management unit, further comprising:

the zone setting management unit sets a zone respectively for a combination of first one of the host ports and first one of the source and target ports via the fabric connection device, and for a combination of second one of the host ports and second one of the source and target ports via the fabric connection device, and manages a zone setting for activating or deactivating a connection status thereof at the each zone.

10. The data migration method for the computer system according to claim 9, wherein in the path migration control step, the source storage subsystem changes a status of first one of the source ports to an unavailable state and an offline state, deactivates the zone setting for the host computer and first one of the source ports, and then sets the first one of the source ports logged off from the fabric connection device;

the target storage subsystem has the first one of the target ports logged in the fabric connection device and also activates the zone setting for the host computer and the first one of the target ports, and then changes a status of first one of the target ports to an available state;

the target storage subsystem further notifies at least one of the target and source storage subsystems including a port belonging to a migration port group including first one of the target ports; and any of the storage subsystems with an available port responds to the new migration port group, which includes information about first one of the target ports of the target storage subsystem, to the host computer.

* * * * *